United States Patent [19]

Anderson et al.

[11] Patent Number: 5,135,029
[45] Date of Patent: Aug. 4, 1992

[54] FUEL HOSE BREAKAWAY UNIT

[75] Inventors: Paul B. Anderson; Donald L. Leininger, both of Cincinnati; Paul H. Siegel, Milford; Lawerence L. Blasch, Cincinnati; David R. Pendleton, Fairfield, all of Ohio

[73] Assignee: Dover Corporation, New York, N.Y.

[21] Appl. No.: 553,227

[22] Filed: Jul. 12, 1990

[51] Int. Cl.$^5$ .............................. F16L 29/00
[52] U.S. Cl. .................................. 137/614.04; 285/1
[58] Field of Search ............. 137/614, 614.03, 614.04; 251/149.7; 285/1, 4, 9, 304, 133.1

[56] References Cited

U.S. PATENT DOCUMENTS

| | | | |
|---|---|---|---|
| 2,441,363 | 5/1948 | Krueger | 285/304 |
| 2,453,741 | 11/1948 | Bopp | 285/304 X |
| 2,915,325 | 12/1959 | Foster | 251/149.7 X |
| 3,152,815 | 10/1964 | Barragato et al. | 285/1 |
| 3,317,220 | 5/1967 | Brunning | 285/1 |
| 3,435,848 | 4/1969 | Johnston | 285/1 X |
| 4,549,575 | 10/1985 | Rogers | 137/614.03 |
| 4,763,683 | 8/1988 | Carmack | 137/614.04 X |
| 4,917,149 | 4/1990 | Grantham | 137/614.03 |

FOREIGN PATENT DOCUMENTS 829096 2/1960 United Kingdom ........... 137/614.03

Primary Examiner—John C. Fox
Attorney, Agent, or Firm—Kinney & Schenk

[57] ABSTRACT

A breakaway unit which is adapted to be mounted in series flow relation with a fuel nozzle. The breakaway unit comprises a flex section which assures an axial transmission of forces to a valve section which is separated when a vehicle drives away from a dispensing unit with the nozzle lodged in its fuel tank. The valve section comprises inlet and outlet couplers and means for releasable locking the couplers in an assembled relation. These means comprise fingers which are flexed outwardly when a separating force exceeds a predetermined value. Garter springs embrace the fingers to accurately control at which the couplers will separate. The fingers engage angularly spaced lugs which permit the fingers to be telescoped therebetween and then rotated to a locking position to facilitate reassembly of the couplers with a minimum of effort. Alternate embodiments of the invention disclose other forms of spring means for accurately controlling the force at which the couplers will separate. Also disclosed are alternate constructions which minimize the effort required for reassembly.

30 Claims, 12 Drawing Sheets

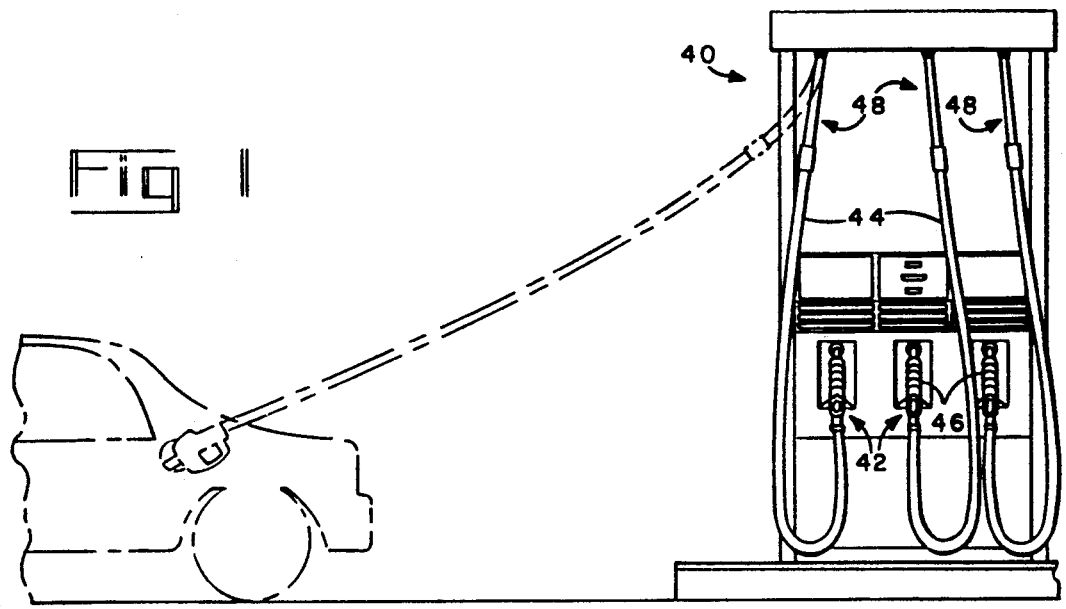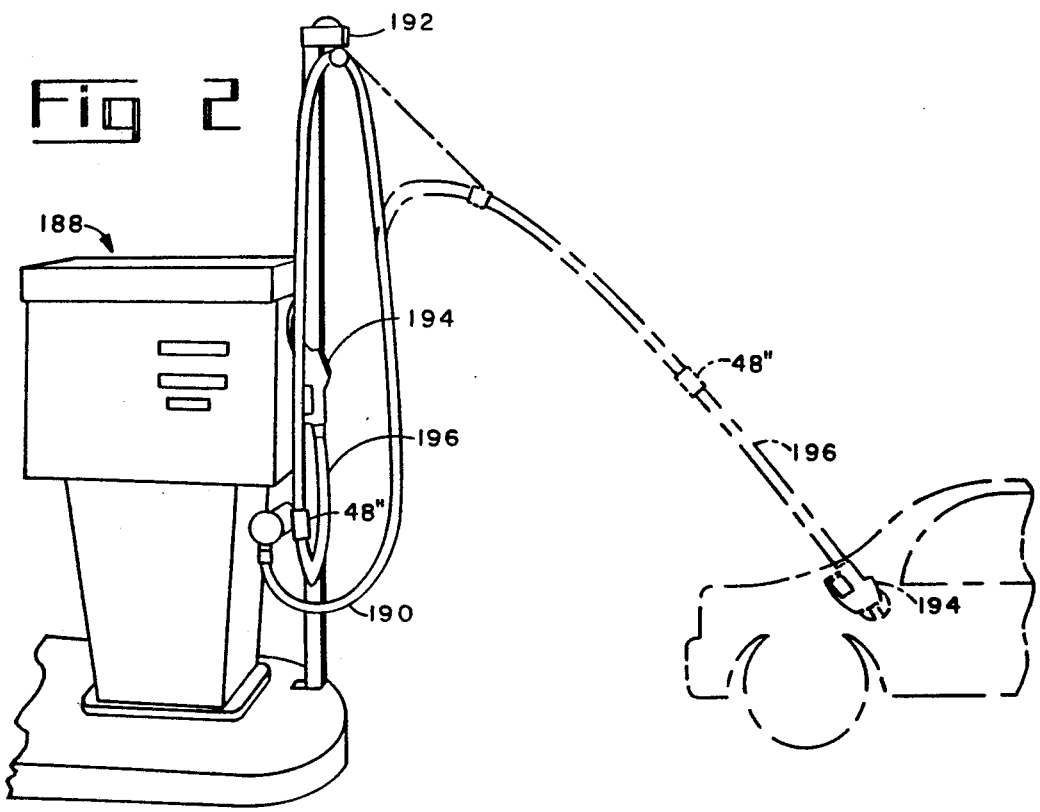

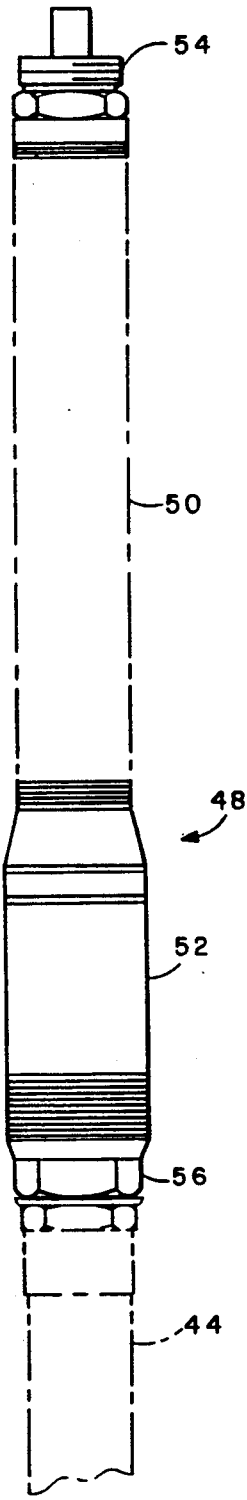
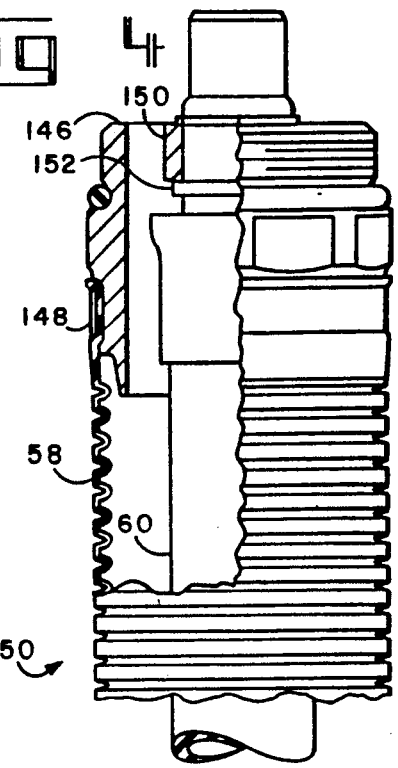
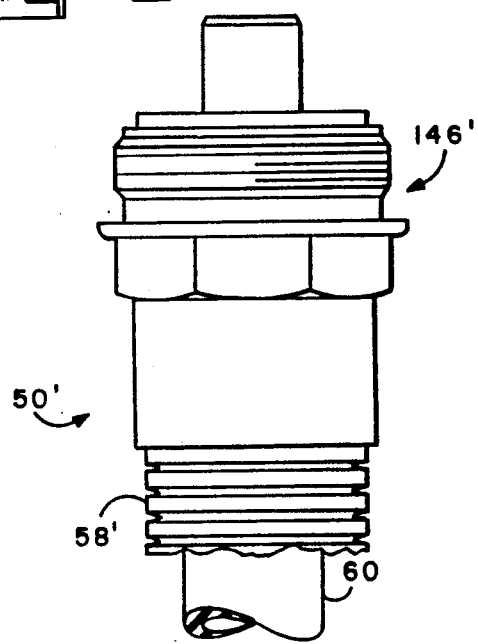

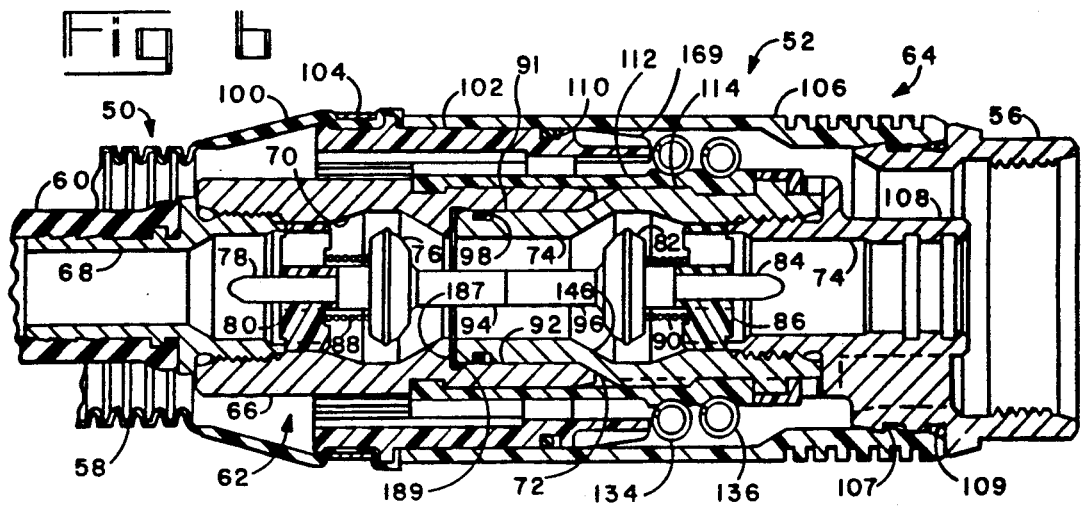
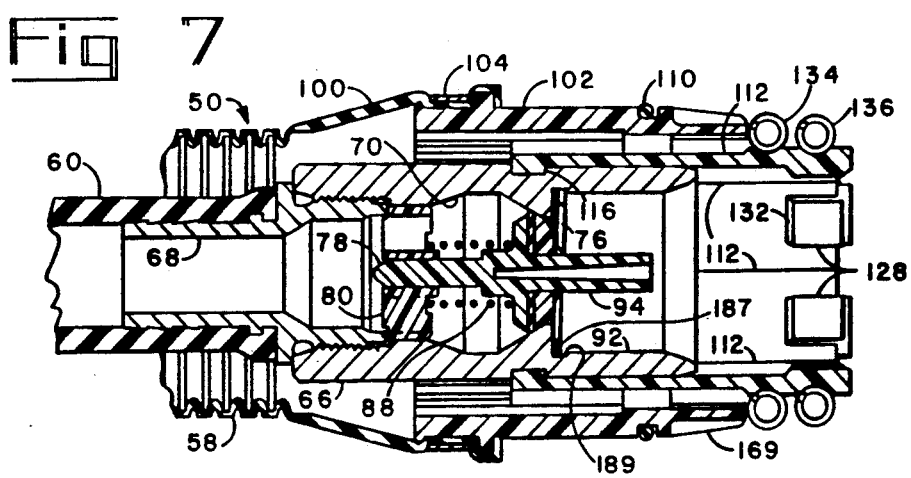
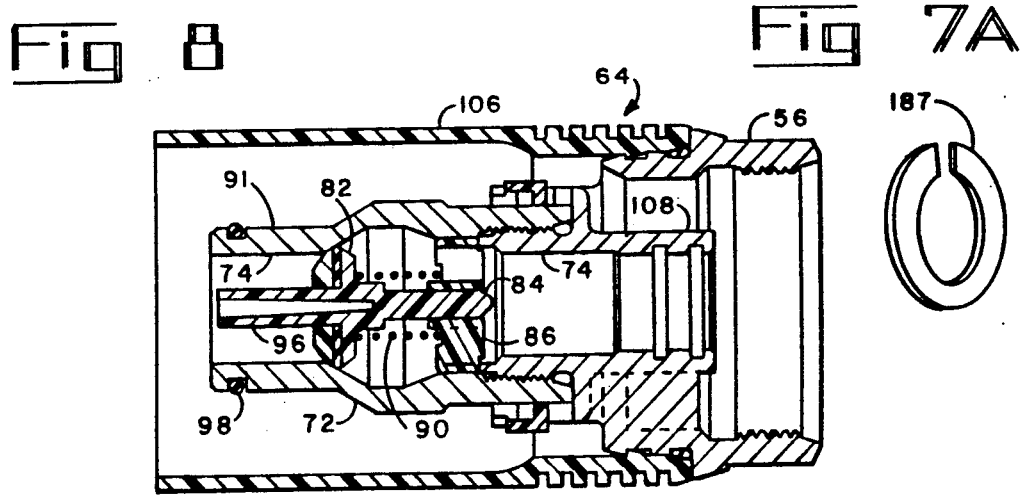

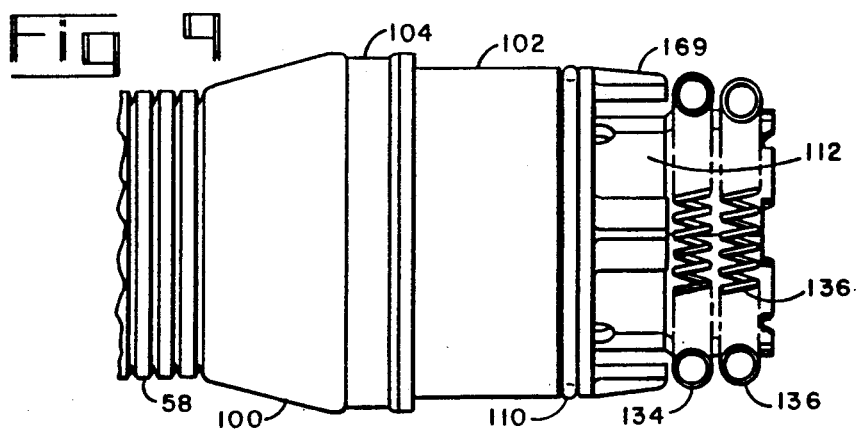
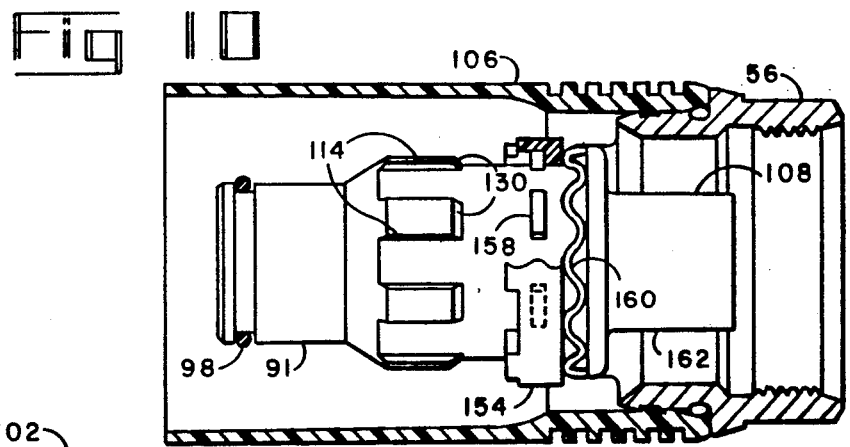
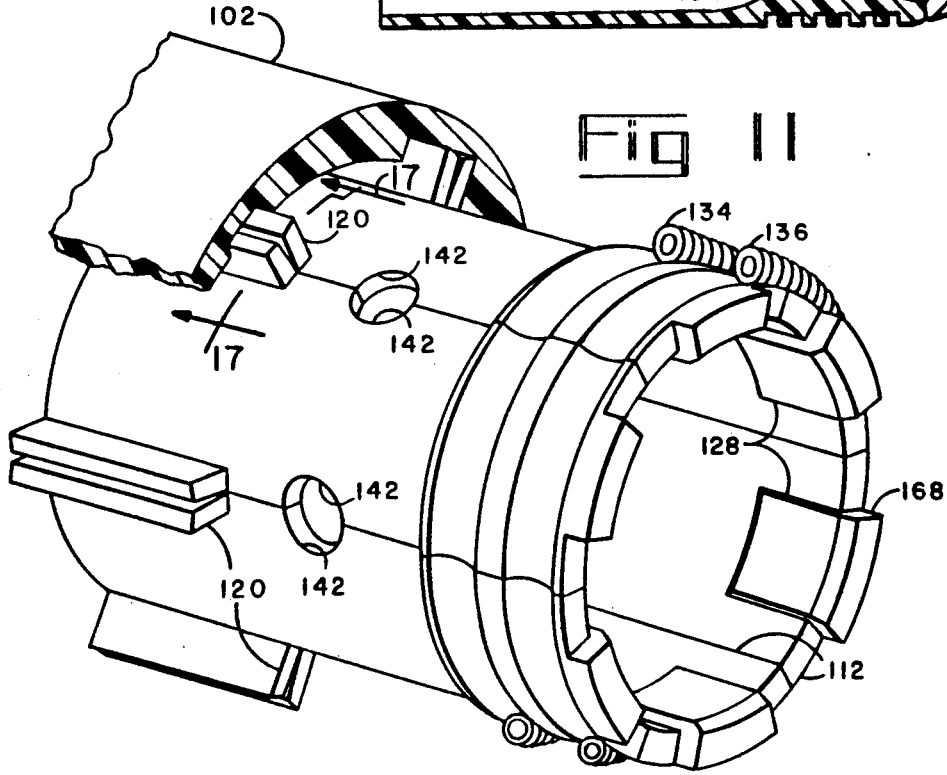

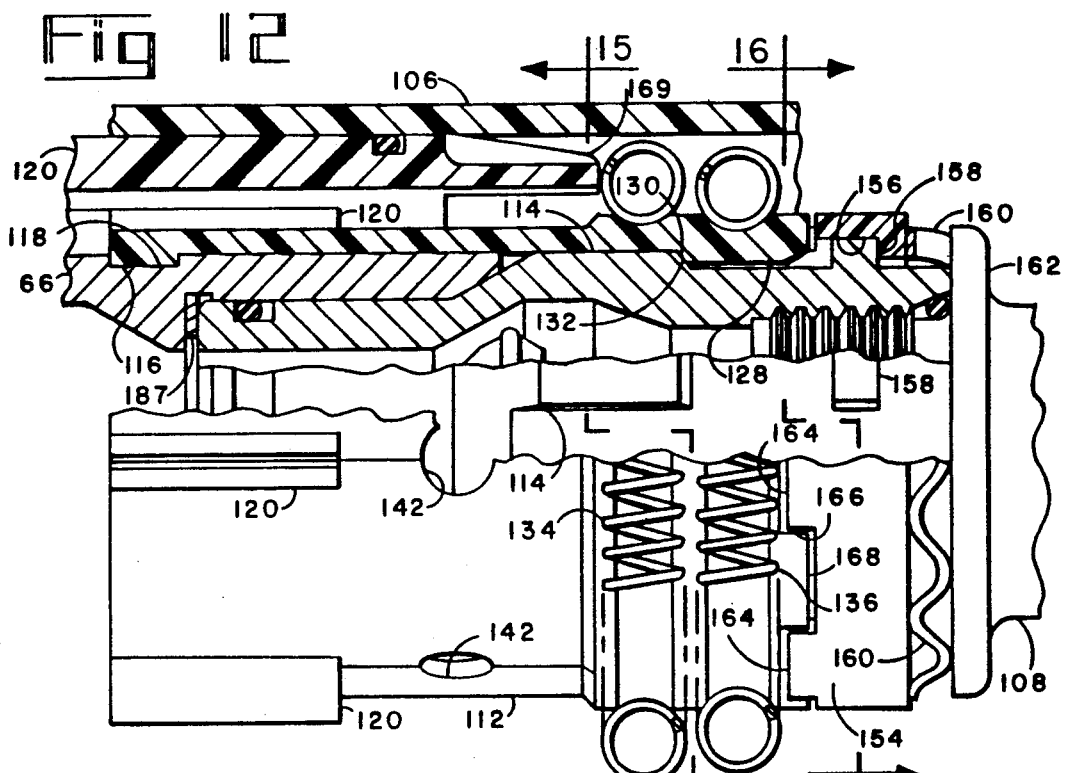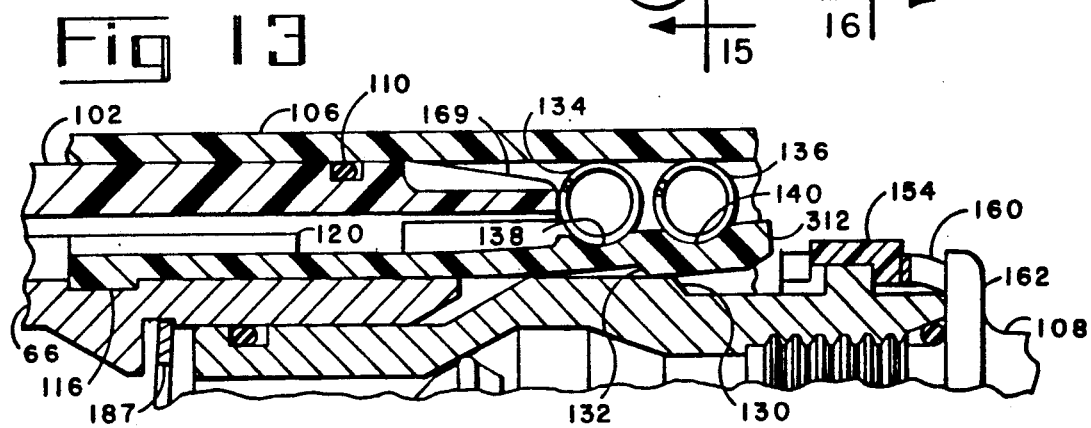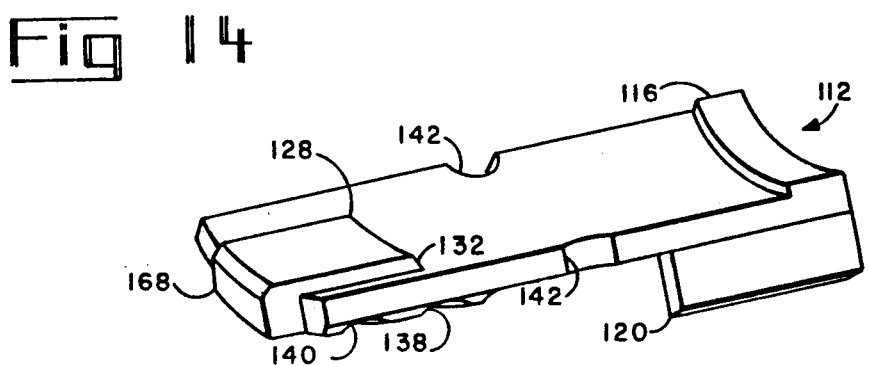

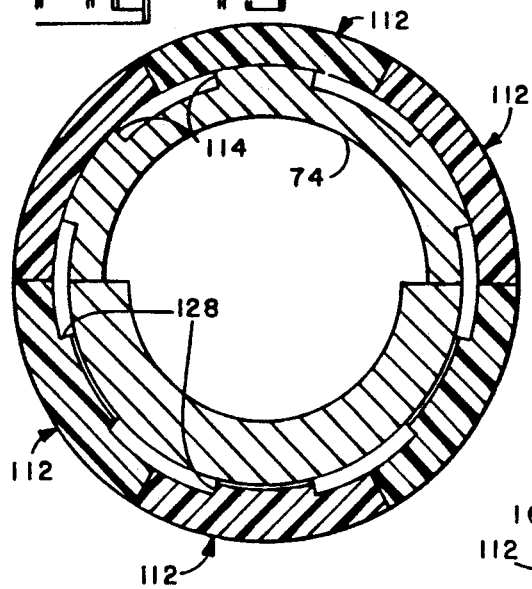
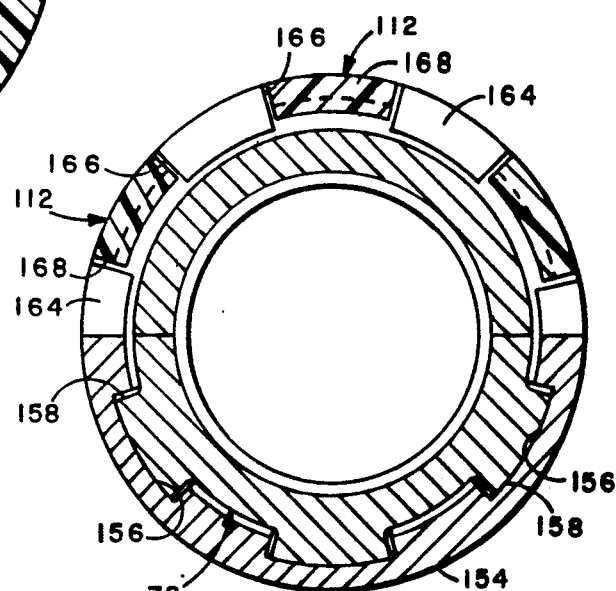
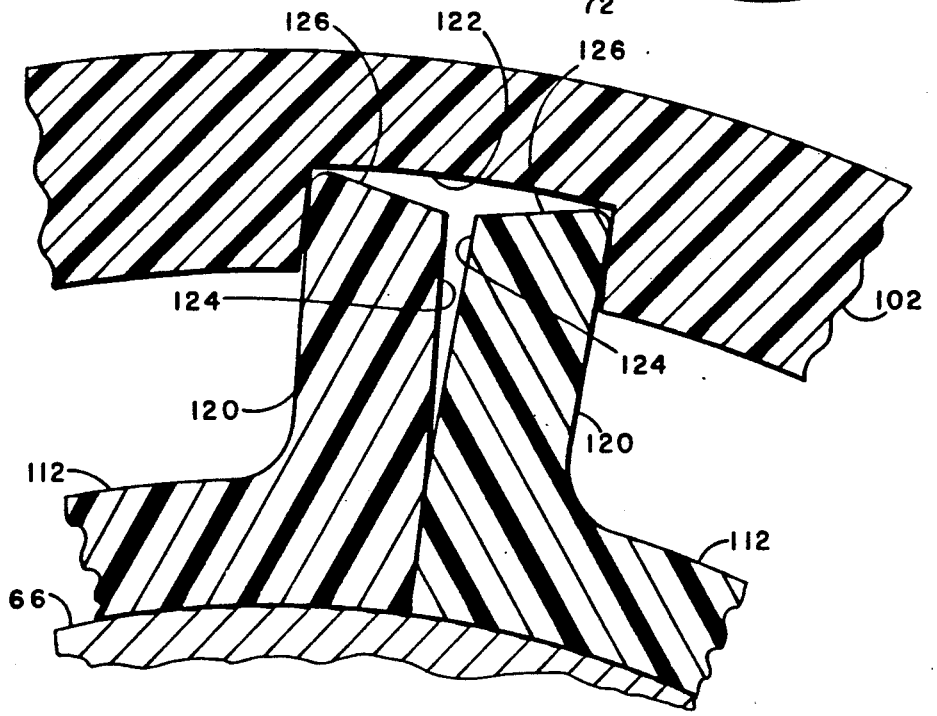

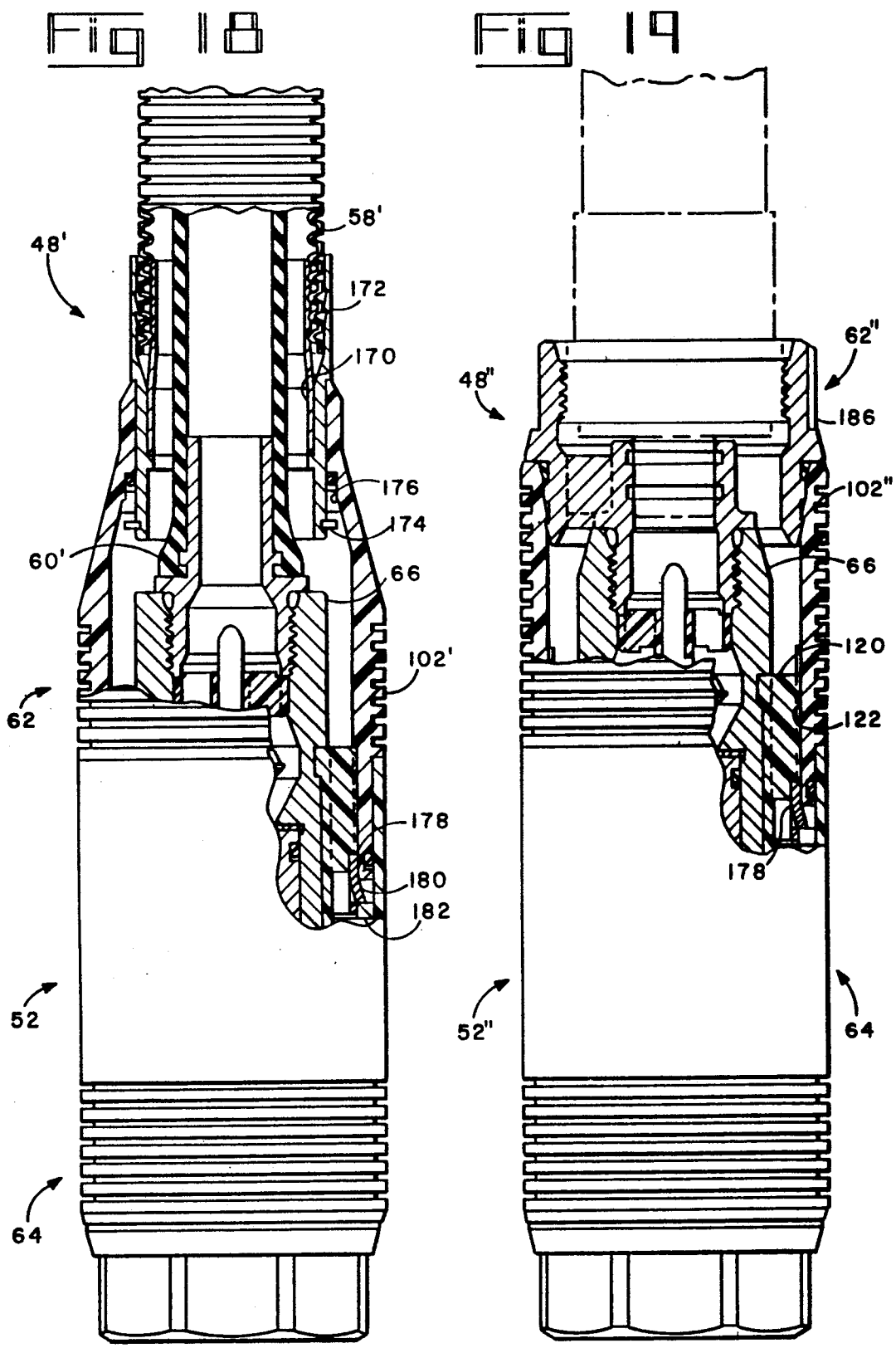

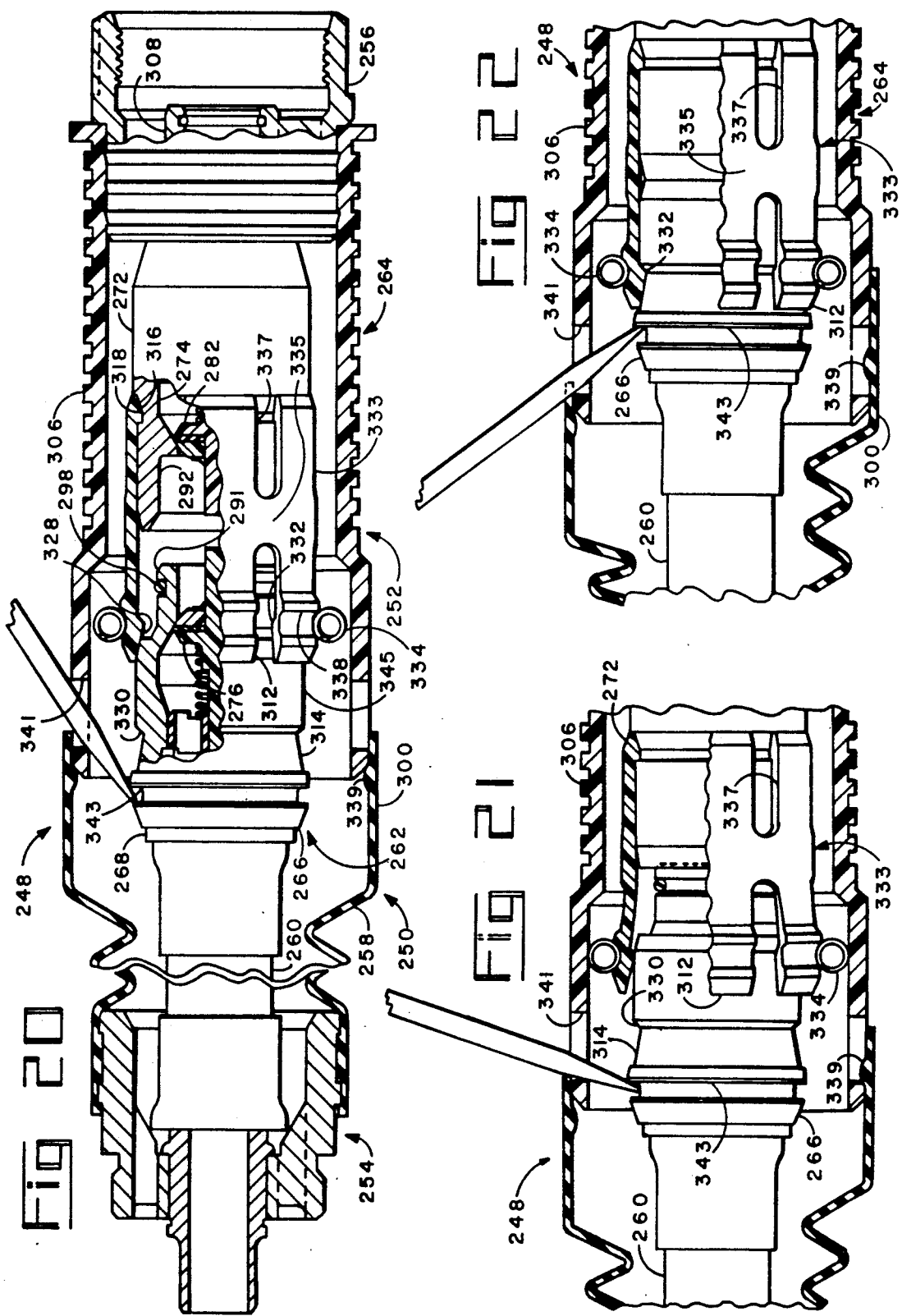

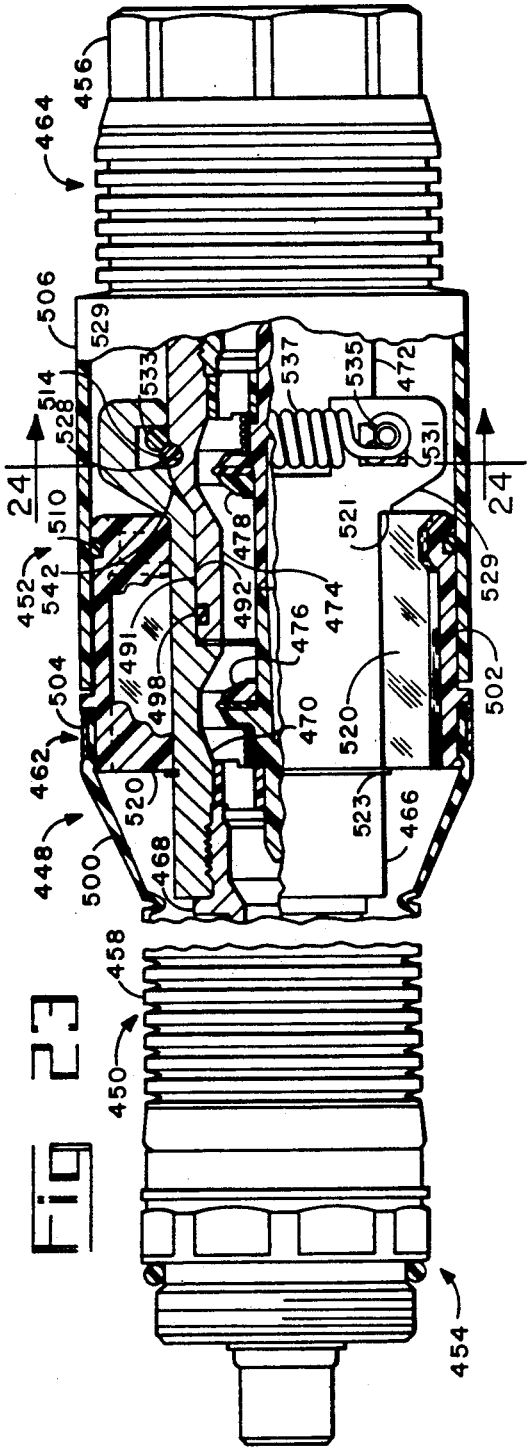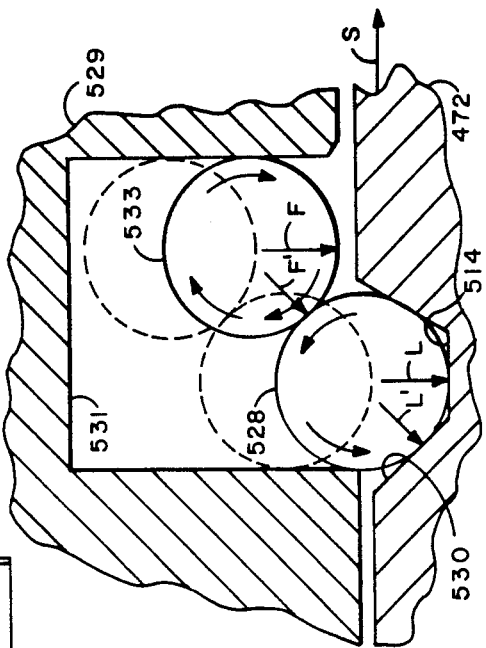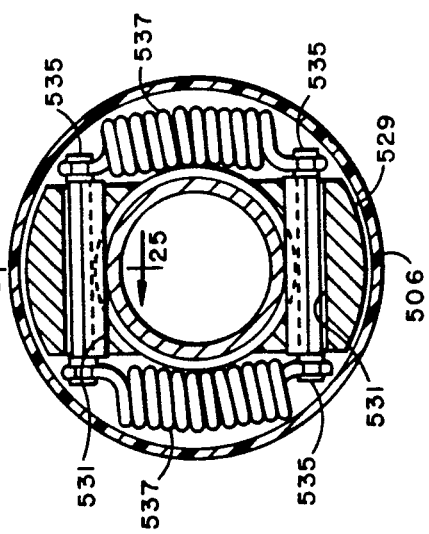

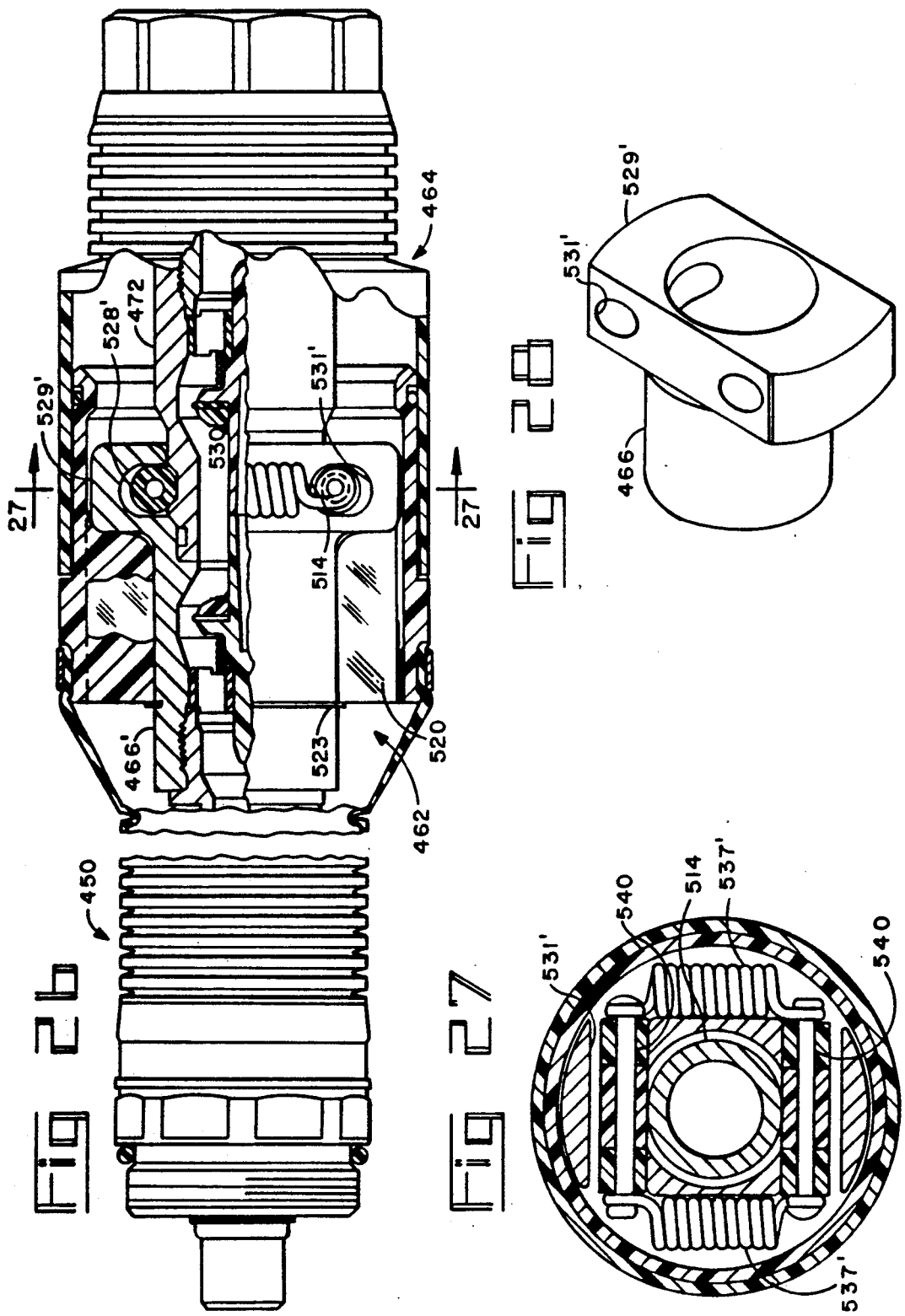

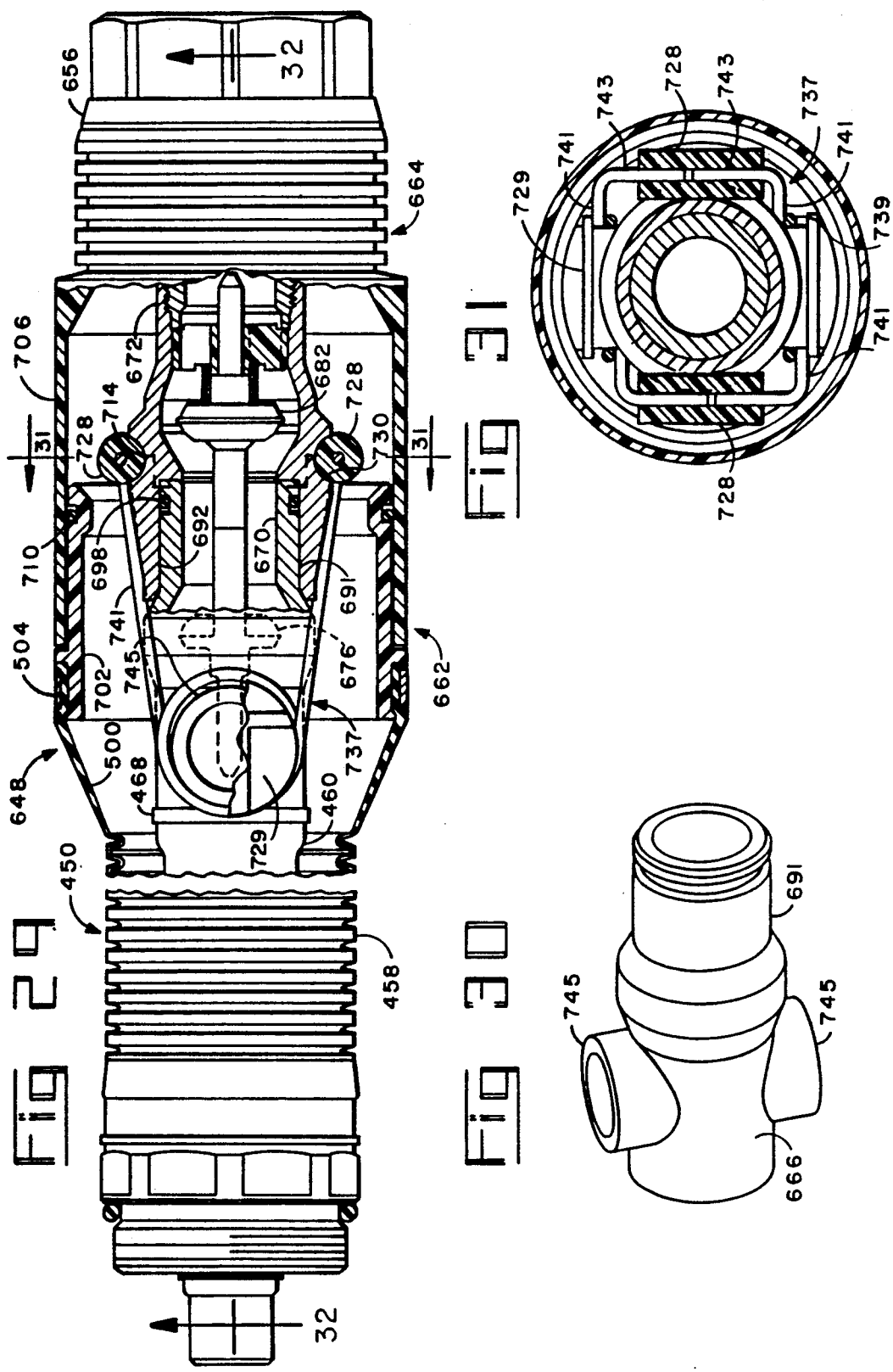

FUEL HOSE BREAKAWAY UNIT

The present invention relates to breakaway units employed in hoses connecting a fuel nozzle to a stationary dispensing unit to minimize, if not prevent, damage and the creation of a hazard in the event a vehicle drives away with a dispensing nozzle in its fuel tank fill pipe. More particularly the invention relates to breakaway units for coaxial hoses employed in systems where fuel vapors are returned to a storage tank in order to minimize air pollution.

While infrequent, there are occasions when a vehicle is driven away from a fuel dispenser without removing the dispensing nozzle from the fill pipe of the vehicle's fuel tank. Such an occurrence, known in the trade as a "drive away", creates the potential for a serious fire hazard, as well as causing damage to the nozzle, fuel hose and the dispenser itself.

This problem has long been recognized. Two basic approaches have been taken in minimizing the hazards associated with a drive away.

One approach has been the provision of a breakaway nozzle spout having a weakened section, which would be downstream of the nozzle shut off valve. When a drive away occurs, the outer portion of the spout is broken off, at the weakened section, by a relatively low force which is insufficient to damage the hose, the dispenser, or the remaining components of the nozzle.

A breakaway nozzle spout is responsive to bending forces thereon and, generally, is effective only when the loading on the spout is in a lateral direction. However, when a drive away occurs, the loading on the spout can have an axial component such that the force transmitted to the hose can cause its rupture, or damage to the dispenser, before the nozzle spout breaks away.

This has led to the adoption of breakaway units which are responsive to axial forces on the fuel hose. These breakaway units comprise a valve in series flow relation with a fuel hose and a fuel nozzle. The tension force, caused by a drive away, is exerted on the hose separating, or disconnecting, the breakaway valve when that force exceeds a force which cause the hose to rupture, or otherwise cause damage to the dispenser and spillage of fuel which would create a fire hazard. The valves of prior breakaway units are of the so-called dry disconnect type which seal the separated portions of the valve so that there is only a minimal amount of fuel released when a drive away occurs.

A breakaway unit can be used as the sole means of protecting against the hazards of a drive away, or in combination with a breakaway spout, so that one provides a back up protection in the case the other fails to breakaway when the force thereon exceeds the limit value.

Two relatively recent developments have impacted the functional requirements of breakaway units. One is the increasing commercial acceptance of so-called "high hose" dispensers in which the nozzle hose is connected to and extends from the upper portion of the dispenser. The other development relates to environmental requirements which dictate that fuel vapors be recovered to prevent their escape into the atmosphere during delivery of fuel.

Normally, a high hose dispenser is anchored at its base on a pedestal, or island, at a service station. This places the point of connection of the fuel hose some eight to twelve feet above ground level. Thus, when a drive away occurs, the pull of the hose on the dispenser has a high leverage tending to topple the dispenser. This has led to a requirement that the maximum permissible breakaway force be set at lower levels than were previously accepted as providing adequate protection.

The reduction of the force required to separate a hose breakaway unit introduces a further problem in that the lowered, permissible, breakaway force approaches the hydraulic, hammer effect, forces which can be generated in a hose when the nozzle valve closes. Many nozzles have a mechanism for automatically closing the nozzle valve when the fuel in a vehicle's tank reaches a predetermined level. Many such mechanisms close the nozzle valve, substantially instantaneously, while fuel is being delivered at a high rate of flow. Such closure can result in a hydraulic tension force (hammer) on the hose which exceeds 200 pounds. This is to be related to a current requirement that the maximum breakaway force be set at 250 pounds.

The most widely used, hose breakaway units depend on shear pins (or other elements which fracture) as the means to release a delivery hose in the event of a drive away. Shear pins have long been recognized as a reliable means for decoupling one element from another when a load exceeds a given limit. However, where they are subject to repeated loads approaching their failure strength, as would be generated by hammer effect forces, fatigue stresses reduce the force at which shear occurs. Breakaway valves embodying shear pins thus become unreliable in that they can separate, to render a nozzle unserviceable, in the normal delivery of fuel. This is both an inconvenience as well as an undesirable expense to the fuel vendor.

Thus, even though shear pins can, initially, provide a small tolerance in the force at which they will fail, fatigue stresses can increase this tolerance so that failure occurs at a force much lower than required for practical, safety purposes.

The second development impacting fuel hose breakaway units is the increasing strictness of environmental requirements. This has led to a more widespread use of vapor recovery, fuel delivery systems, which involve the use of nozzles having means for conducting vapor from the fuel tank back to the storage tank from which the fuel is being delivered. One widely employed vapor recovery system employs a bellows which is telescoped over a nozzle spout to form a coaxial vapor return passage, in combination therewith. The free end of the bellows sealingly engages the fuel fill pipe so that vapor displaced from the tank is captured in this passage. The vapor then passes, through the body of the nozzle, to a coaxial hose. The coaxial hose has an inner hose through which fuel passes and an outer, coaxial, spaced hose which defines a vapor passage through which the fuel vapor passes to the dispenser and then back to the storage tank.

It is axiomatic that a breakaway unit for vapor recovery fuel systems must provide a return flow passage for vapors and be connectable with the coaxial hose on which the nozzle is mounted. Standard connections, known as adapters, are now recognized for making connections with coaxial, vapor recovery hoses. These connectors are inherently expensive.

The expense factor makes essential the ability to reuse a breakaway unit after it has been separated by a drive away. Previously, many breakaway units, or breakaway valves, had been relatively inexpensive and it was economical to dispose of them when a drive away occurred, since it is a relatively rare occurrence. With the advent of coaxial breakaway units, most breakaway units can be reused, but only by returning them to the manufacturer for reassembly or by having them reassembled, on site, by an authorized service person. This means that the fuel vendor must inventory at least one spare breakaway unit in order to have assurance that a dispensing unit will not be placed out of service in the event of a drive away.

With theses factors in mind, the general object of the present invention is provide an improved breakaway unit for protecting against hazards and damage in the event a vehicle is driven away from a fuel dispenser while the delivery nozzle is still inserted in the vehicle's fuel tank fill pipe.

A more specific object of the present invention is to provide a breakaway unit having a small tolerance in the force at which separation of the elements occurs. This end assures that separation will occur before a force that can cause damage occurs, while at the same time preventing separation as the result of hammer effect forces.

Another related object of the present invention is to provide an improved breakaway unit which reliably releases when a predetermined tension force is exerted by a drive away vehicle.

Yet another object of the present invention is to provide an improved, low cost breakaway unit which may be employed in vapor recovery systems employing coaxial hoses.

Still another object of the present invention is to provide an improved breakaway unit which can be readily reassembled in the event that it is separated by a drive away vehicle.

A related object of the present invention is to prevent damage to the portion of the breakaway unit which is dragged along the ground by a drive away vehicle.

In accordance with on aspect of the invention, the foregoing ends are attained by a fuel hose breakaway unit adapted to be connected in series flow relation with a fuel hose and a fuel dispensing nozzle to minimize, if not fully prevent, damage in the event a vehicle is driven away with the nozzle lodged in the vehicle's fuel tank.

This breakaway unit may comprise an inlet coupler, an outlet coupler, and means for releasably locking the couplers in an assembled relation. The releasable locking means comprise fixed abutment means formed on one of the couplers. The fixed abutment means may take the form of a groove or lugs.

The releasable locking means also include moveable abutment means, carried by the other coupler and having a locking position in which the abutment means are engaged to prevent longitudinal separation of the couplers. The moveable abutment means may take the form of rollers or abutment surfaces formed on longitudinally extending fingers.

The abutment means provide means for camming the moveable abutment means to a release position in which the couplers may be separated. Resilient means provide a force resisting displacement of the moveable abutment means to the release position. The camming means are responsive to a separating force on the outlet coupler exceeding a predetermined value, to displace the moveable abutment means to the release position.

This hose breakaway unit is characterized by separate spring means acting on the moveable abutment means. The separate spring means provide at least the major portion of any force resisting displacement of the moveable abutment means to the release position.

This breakaway unit economically attains the desired ends of economy and a small tolerance in the separation force by reason of the fact that springs, particularly coil springs can be economically formed to reliably provide a given resilient force in response to a given amount of displacement.

This unit may be further characterized by the use of longitudinally extending, locking fingers, as the moveable abutment means, and garter springs as the separate spring means. The locking fingers would be flexed in being displaced to a release position and thus provide resilient means resisting that displacement. The garter springs, however, would provide at least the major portion of this resisting force in order to obtain the desired small tolerance in the release force.

Where rollers are employed as the moveable abutment means, tension or torsion springs may be connected thereto as the sole means of providing a force to resist displacement of the moveable abutment means to a release position.

Related ends of the invention may be attained by a similar fuel hose, breakaway unit where the moveable abutment means take the form of a locking roller means, characterized by means mounting the locking roller means for rotation about its own axis and rolling movement relative to the fixed abutment means as it is displaced to the release position.

Preferably, the moveable abutment means comprise a pair of diametrically opposed locking rollers.

The desired rolling movement may be obtained by disposing the locking rollers in slots formed in wings provided on the other coupler. These slots are registered with the fixed abutment means and permit the locking rollers to enter therein when displaced to a release position. The yieldable means for maintaining the rollers in a locking position may comprise tension springs, respectively, connected to opposite ends of the locking rollers. These springs provide the entire force holding the rollers in the locking position and thereby provide a small tolerance for the releasing force.

Where the fixed abutment means comprise fixed, angled, abutment surface means facing away from the mating end of the one coupler, improved rolling contact may be obtained by a pair of diametrically opposed locking rollers. These locking rollers are mounted in transverse slots formed in wings formed on the other coupler. The slots permit the locking rollers to enter therein when displaced to a release position. A pair of pressure rollers are, respectively, disposed in the wing slots. Tension springs, respectively, connect opposite ends of the pressure rollers. The pressure rollers are disposed outwardly of the locking rollers and urged thereagainst by the tension springs. The pressure rollers are disposed to bear against walls of the slots which face the fixed abutment surface means, whereby there will be rolling movement between the pressure rollers and the slots and also rolling movement between the locking rollers and the fixed abutment surface means and the slot, as the locking rollers are displaced to a release position.

The desired rolling action and small tolerance of the release force may also be provided where the fixed abutment means comprise fixed, angled, abutment surface means facing away from the mating end of the one coupler. The moveable abutment means may also comprise a pair of diametrically opposed locking rollers.

These locking rollers are then resiliently urged to a locking position by a pair of torsion springs. Each torsion spring comprises a coil section, mounted on the other coupler and has legs extending longitudinally therefrom. The locking rollers are rotatably mounted on the spring legs to longitudinally position the locking rollers relative to the fixed abutment surface means and guide the locking rollers as they are displaced to a release position.

The end of enabling or facilitating assembly, or reassembly of inlet and outlet couplers of a fuel hose, breakaway unit may be attained by a breakaway unit wherein means for releasably locking the couplers in an assembled relation comprises fixed abutment means formed on one of the couplers and moveable abutment means, carried by the other couplers. The moveable abutment means has a locking position in which the abutment means are engaged to prevent longitudinal separation of the couplers.

The abutment means include means for camming the moveable abutment means from the locking position to a release position in which the couplers may be separated. The camming means are responsive to a separating force on the outlet coupler to displace the moveable abutment means to the release position.

This breakaway unit is characterized in that the fixed abutment means are angularly spaced. The moveable abutment means comprise a plurality of angularly spaced abutment elements. The moveable abutment elements have a width permitting them to pass between the angularly spaced, fixed abutment means, to a telescoped position longitudinally aligned with the locking position. The fixed and moveable abutment means are relatively rotatable from the telescoped position to the assembled position, thereby providing for assembly of the couplers with a minimum of effort.

Additionally, means may be provided for preventing relative rotation between the fixed and moveable abutment means when the couplers are in the assembled relation.

In a preferred form, the fixed abutment means comprise angularly spaced, fixed lugs. The moveable abutment means comprise a plurality of longitudinal, locking fingers having inwardly facing lugs respectively, engaged with the fixed lugs in the locking position.

Disengagement of the couplers by rotation therebetween may be prevented by a locking ring mounted on the one coupler for longitudinal movement relative thereto. Means are then provided for preventing rotation of the locking ring relative to the one coupler. Cooperating notch and lug means are engaged when the locking fingers are in the locking position and prevent relative rotation of the locking fingers relative to the locking ring.

The foregoing breakaway unit requires only a minimal manual force to reassemble the breakaway unit after it has been separated by a drive away.

Ease of reassembly can also be attained by an alternate breakaway unit which also comprises inlet and outlet couplers. Means are provided for releasably locking the couplers in an assembled relation, including fixed and moveable abutment means, as above referenced.

Assembly cam means are then provided for displacing the moveable abutment means to the release position as the couplers are telescoped toward an assembled, locking position.

Ease of assembly is provided by leverage means formed, respectively, on the inlet coupler and the outlet coupler, the leverage means being adapted to be engaged by a screw driver, or the like, and provide a mechanical advantage in telescoping the couplers to the assembled relation.

Preferably, one of the couplers, preferably the outlet coupler, comprises a body and a sleeve. The other coupler, preferably the inlet coupler, comprises a body, which is telescoped within the sleeve in the assembled relation of the couplers. The releasable locking means are effective between the coupler bodies. The leverage means comprise a slot formed in the sleeve and notch means formed in the body of the other coupler.

A related end of the invention provides protection for the mating portion of an outlet coupler so that it can be reassembled with an inlet coupler, after a drive away occurs.

This end may be attained by a fuel hose, breakaway unit comprising an inlet coupler, an outlet coupler, having mating portions in an assembled relation. The mating portions include means for releasably locking the couplers in an assembled relation. The locking means are responsive to a longitudinal force of predetermined magnitude to release the outlet coupler from the inlet coupler.

This breakaway unit is characterized in that the outlet coupler includes an outer protective sleeve and the mating portions of the outlet coupler are disposed within the protective sleeve. The mating portions of the outlet coupler are, thus protected from damage when the outlet coupler is released from the inlet coupler upon the occurrence of a drive away.

In a preferred form, the protective sleeve forms all, or part of a vapor return passage through the breakaway unit.

Other ends of the invention are attain by a fuel hose, breakaway unit adapted to be connected in series flow relation with a hose and a fuel dispensing nozzle where the fuel nozzle has means for recovering vapor generated during the delivery of gasoline and the hose is a coaxial hose having a central fuel passage and a coaxial vapor return passage.

In this breakaway unit, the inlet coupler and the outlet coupler have, respectively, inlet and outlet bodies which have central fuel passages. Means are provided for connecting at least one of the coupler bodies to the fuel hose of a coaxial hose. Sleeve means are spaced outwardly from these bodies and provide an annular vapor return passage.

With this arrangement, the axial, tension forces to which the breakaway unit is subjected, when a drive away occurs, are carried directly through the fuel hose and the bodies of the couplers.

Various features, as above identified, can be advantageously incorporated in this last described breakaway unit.

A further problem, addressed by the present invention is that of assuring that a longitudinal force will be exerted on the breakaway unit when it is mounted on a high hose fuel dispenser.

This problem is overcome by a breakaway unit, particularly intended for use with a high hose fuel dispenser and adapted to be connected thereto, in series flow relation with a hose and a fuel dispensing nozzle. The fuel nozzle has means for recovering vapor generated during the delivery of gasoline and the hose is a coaxial hose having a central fuel passage and a coaxial vapor return passage.

This breakaway unit comprises a flex section and a valve section. The valve section comprises an inlet coupler comprising an inlet body having a central fuel passage and an outlet coupler comprising an outlet body also having a central fuel passage. The fuel passages are in flow communication in an assembled relation of the couplers.

Means are provided for releasably locking these couplers in the assembled relation. The locking means are responsive to a longitudinal force of predetermined magnitude to release the outlet coupler from the inlet coupler. Sleeve means spaced outwardly from the inlet and outlet bodies, define a vapor return passage, , in combination therewith.

The flex section comprises a central hose having one end connected to the inlet body in flow communication with the fuel passage there. A bellows tube coaxially spaced from the hose forms, in combination therewith, a vapor return passage. The bellows tube has one end connected to the sleeve means. The other ends of the hose and bellows tube are connected to an adapter. The adapter is connectable with the fuel dispenser to place the hose in communication with a source of pressurized fuel and place the vapor passage in communication with a further vapor recovery conduit means.

The above and other related objects and features of the invention will be apparent from a reading of the following description of preferred embodiments, with reference to the accompanying drawings, and the novelty thereof pointed out in the appended claims.

In the drawings:

FIG. 1 is an elevation of a fuel dispensing unit in which the present breakaway unit is incorporated;

FIG. 2 is a side view of a different style of fuel dispensing unit in which an alternate breakaway unit may be incorporated;

FIG. 3 is an elevation of a breakaway unit embodying the present invention;

FIG. 4 is an elevation of the upper portion of the breakaway unit seen in FIG. 3, on an enlarged scale and with portions in section;

FIG. 5 is an elevation of the upper portion of an alternate breakaway unit;

FIG. 6 is a longitudinal section of a valve section of the breakaway unit seen in FIG. 3;

FIG. 7 is a longitudinal section of an inlet coupler comprising the valve section seen in FIG. 6;

FIG. 7A is a perspective view of a grounding element employed in the breakaway unit;

FIG. 8 is a longitudinal section of an outlet coupler comprising the valve section seen in FIG. 6;

FIG. 9 is an elevation of the inlet coupler of the valve section;

FIG. 10 is an elevation, with portions in section, of the outlet coupler of the valve section;

FIG. 11 is a perspective view, on an enlarged scale and with portions broken away and in section, of locking elements of the inlet coupler;

FIG. 12 is an elevation, on a further enlarged scale, of the locking elements of the inlet and outlet couplers, with portions in longitudinal section;

FIG. 13 is a fragmentary section of the locking elements, seen in FIG. 12, illustrating a partially disengaged position;

FIG. 14 is a perspective view of one of the locking elements mounted on the inlet coupler;

FIG. 15 is a section taken on line 15—15 in FIG. 12;

FIG. 16 is a section taken on line 16—16 in FIG. 12;

FIG. 17 is a section, on a further enlarged scale and in a rotated orientation, taken on line 17—17 in FIG. 11;

FIG. 18 is an elevation, with portions broken away and in section, of the lower end portion of an alternate breakaway unit, being adapted for use with the upper breakaway unit portion illustrated in FIG. 5;

FIG. 19 is a an elevation of another breakaway unit, with portions broken away and in section;

FIG. 20 is a longitudinal section of a further breakaway unit, illustrating the method of its reassembly;

FIG. 21 illustrates partial assembly of the breakaway unit of FIG. 20;

FIG. 22 illustrates the breakaway unit of FIG. 20 in its assembled relation;

FIG. 23 is a fragmentary, longitudinal section of yet another breakaway unit;

FIG. 24 is a section taken on line 24—24 in FIG. 23;

FIG. 25 is a section, on an enlarged scale, taken on line 25—25 in FIG. 24;

FIG. 26 is a longitudinal section of yet another breakaway unit;

FIG. 27 is a section taken on line 27—27 in FIG. 26;

FIG. 28 is a perspective view of an inlet body seen in FIG. 26;

FIG. 29 is a longitudinal section of still another breakaway unit;

FIG. 30 is a perspective view of an inlet body seen in FIG. 29;

FIG. 31 is a section taken generally on line 31—31 in FIG. 29; and

Figure 32:
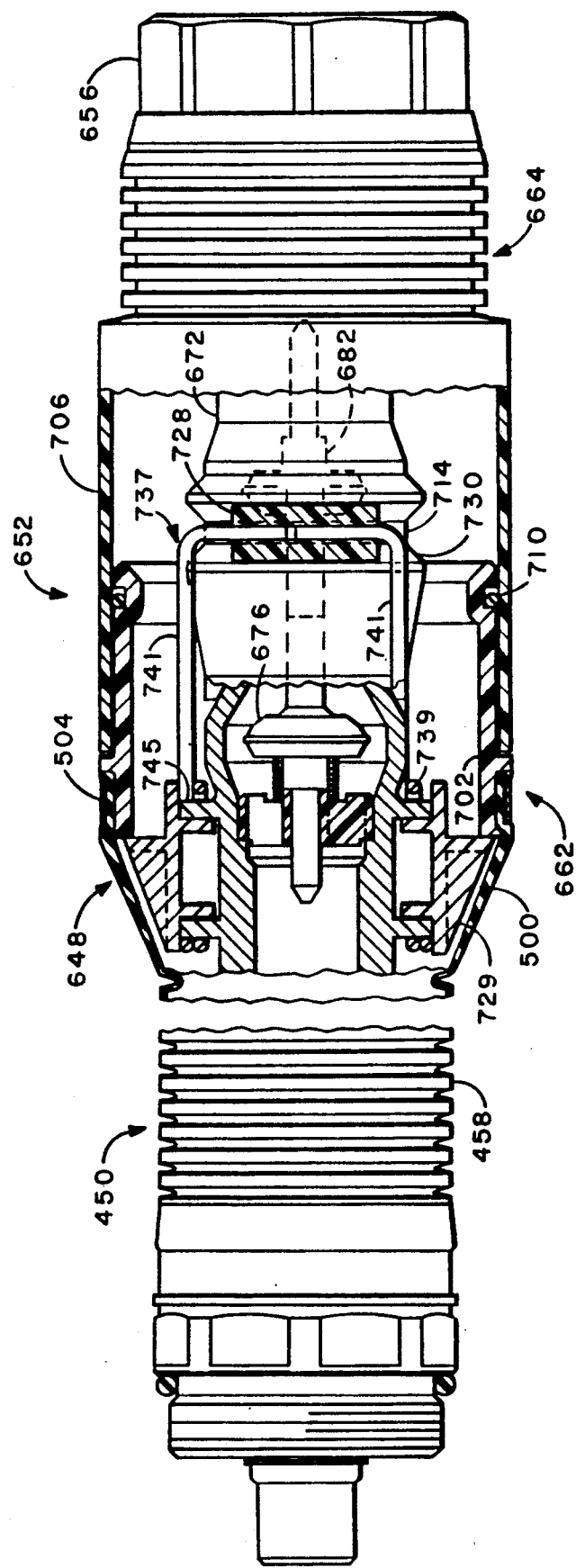
FIG. 32 is a section taken on line 32—32 in FIG. 29.

FIG. 1 illustrates a fuel dispenser 40 of the so-called high hose type which has three nozzles 42 for delivery of gasoline, or the like, into the fuel tank of a vehicle. Each nozzle 42 is mounted on a hose 44 for connection with a fuel conduit mounted interiorly of the dispenser. The internal fuel conduits, in turn are connected to a source of pressurized fuel. In use, a nozzle is removed from the dispenser and inserted into a vehicle's fuel tank for the delivery of fuel, all as is well known to those skilled in the art.

The dispenser 40, nozzles 42 and hoses 44 are of the type employed in recovering vapors that are generated in the delivery of fuel. Each nozzle has a bellows 46 which engages the fill pipe of a vehicle to form a vapor return passage coaxially of the nozzle's spout. Each hose 44 is of the coaxial type comprising an internal hose through which the pressurized fuel flows and an outer, spaced hose which forms a vapor return passage extending to the dispenser 40. Further conduit means, within the dispenser, then return the vapors, displaced from the vehicle's tank, to the fuel storage tank, or otherwise dispose of the vapor, to the end that the vapor does not escape into and pollute the atmosphere.

Vapor recovery fuel dispensing apparatus of the type referenced is well known in the art.

Pursuant to the present invention, each hose 44 is connected to the dispenser 40 through a breakaway unit 48 which will now be described in detail. The function of the breakaway units 48 is to protect the dispenser 40 against serious damage in the event that a vehicle is driven away from the dispenser while the nozzle is in its fill pipe. It likewise provides protection if the hose is otherwise caught on the drive away vehicle, as by being caught on its bumper. The breakaway unit 48 also serves the function of minimizing, if not eliminating, spillage of fuel when such an event occurs.

The breakaway unit 48 comprises a flex section 50 (FIG. 3) and a valve section 52. As will later be described, separate, coaxial passages are provided within the breakaway unit 48 for delivery of gasoline and return of vapors. An adapter 54, at the free end of the flex section 50, provides means attaching of the breakaway unit 48 to the dispenser 40, in a known fashion, which respectively connects the fuel and vapor passages in appropriate fashion. Likewise, a fitting 56 is provided at the opposite end of the breakaway unit 48 for connection with the hose 44 and the respective fuel and vapor passages thereof.

FIG. 6 illustrates the valve section 52 and the connecting portion of the flex section 50 in greater detail. The main portion of the flex section 50 comprises an outer bellows 58 and an inner hose 60. The inner hose 60 provides a fuel flow passage through the flex section 50 and the hose 60 and bellows 58 define an annular, vapor return flow passage through the flex section.

The valve section 52 comprises an inlet coupler 62 and an outlet coupler 64 which are shown in their coupled relation in FIG. 6. The inlet coupler 62 is separately shown in FIGS. 7 and 9, and the Outlet coupler 64 is separately shown in FIGS. 8 and 10.

The inlet coupler 62 includes an inlet body 66 into which a fitting 68 is threaded. Hose 60 is telescoped over the fitting 68 to form a fluid tight connection therewith and to provide communication with an internal fuel flow passage 70. The outlet coupler 64 comprises an outlet body 72 into which the fitting 56 is threaded. The outlet body has a central fuel passage 74 which is connected to the central fuel hose of the hose 44 when the fitting 56 is connected thereto.

The inlet body 66 has a poppet valve member 76 disposed in the fuel passage 70. The poppet 76 has a stem 78 slidable in a spider 80. Similarly, the outlet body 72 has a poppet valve member 82 disposed in fuel passage 74 with a stem 84 slidable in a spider 86.

A spring 88 urges the poppet 76 towards its closed position and a spring 70 urges the poppet 82 towards its closed position. In the coupled position of the couplers 62, 64, FIG. 6, a pilot 91, defining the free end of the outlet body 72, is received within a bore 92 formed in the free end of the inlet body 66. The valve members 76 and 82, respectively, have stems 94, 96 which abut in this coupled relation thereby providing for the flow of fuel through the passages 70, 74. O-ring 98 provides a seal between the pilot 91 and the bore 92.

The vapor passage, through the valve section is provided by the structure now to be described. A conical sleeve 100 (FIG. 6) is formed integrally with the bellows 58 and extends coaxially of the inlet body 66. The conical sleeve 100 is secured to an inlet coupler sleeve 102 by a band clamp 104. The inlet coupler sleeve 102 is telescoped within an outlet coupler sleeve 106 which, in turned is mounted on the fitting 56, being held in place by a snap fit connection 107, which compresses an O-ring 109 to provide a vapor seal between the sleeve 106 and the fitting 56. The fitting 56 comprises an integral spider providing a hub 108, in which the fuel passage 74 is also formed. The conical sleeve 100, the inlet sleeve 102, the outlet sleeve 106 and the fitting 56 define the outer bounds of the vapor flow path. O-ring 110 provides a seal between the telescoped sleeves 102 and 106. The inner bounds of the vapor flow path is defined by inlet body 66, the outlet body 72 and the fitting hub 108 and hose 60.

The releasable connection, or locking means, between the inlet coupler 62 and the outlet coupler 64 is provided by locking elements now to be described.

The releasable connection utilizes a plurality of fingers 112 mounted on the inlet body 66 and engageable with lugs 114 projecting from the outlet body 72. Preferably, six fingers 112 are employed. An individual finger 112 is illustrated in FIG. 14. The fingers are, basically, in the form of annular segments having an inner diameter which approximates the outer diameter of the inlet body and the curved outer surfaces of the lugs 114.

The fingers are axially locked relative to the inlet body 66 by inwardly projecting lugs 116 which project into an annular groove 118 formed in the inlet body 66. Each finger also has, at each side edge, an outwardly projecting spline 120. The splines 120 of adjacent fingers 112 are received in longitudinal slots 122 (see also FIGS. 11 and 17). From FIG. 17, it will be seen that the outwardly facing side surfaces 124 of the splines 120 are sloped at a low angle (three deg. being typical) from a radial plane to space the ends of the splines which are received in a groove 120. This enables the splines 120 to be flexed so that they will firmly seat in the slots 122. Also to be noted is that the outer surfaces 126 of the splines 120 are angled outwardly from their side edges.

It will also be apparent that the splines 120 provide radial vanes which position the inlet sleeve 102 coaxially of and in spaced relation from the inlet coupler body 66.

The fingers 120, at their outer ends, have lugs 128 which are aligned with the outlet body lugs 114 when the couplers of the valve section 52 are joined together in assembled relation (FIG. 6) for delivery of fuel. The facing surfaces 130, 132 of the lugs 114, 128, respectively, provide abutment means which prevent separation of the inlet and outlet couplers 62, 64 (see also FIG. 12) when normal tension forces are applied thereto by the hose 44 in the delivery of fuel.

The surfaces 130, 132 are angled (technically, they are frustoconical segments) so that the fingers 112 will be flexed outwardly, when a relatively high tension force is exerted through the delivery hose 44, as could occur if a vehicle drove away from the dispensing unit while the nozzle was still in the fill pipe. Initial separation of the couplers 62, 64 is illustrated in FIG. 13.

The axial force which will flex the fingers 112 to a point where separation occurs is a function of radially inward forces resisting outward movement of the free ends of the fingers, in combination with the mechanical advantage of the angled engaging surfaces 130, 132.

In order to better control the forces resisting outward deflection of the fingers, garter springs 134, 136 are mounted on the outer surface of the cylinder which is compositely formed by the fingers 112. These springs are mounted, respectively, in grooves 138, 140 compositely defined by the fingers 112. The springs 134, 136 provide a radially inward force which resists outward deflection of the fingers 112.

Notches 142 are formed in the fingers 112 to define a hinge line, or flex line therebetween, about which the free ends of the fingers 112 flex when cammed outwardly by the surfaces 130, 132. The fingers are, preferably formed of a relatively low strength material having a thickness such that they will readily flex about this hinge line. Delrin resin is a suitable material for forming the fingers which are preferably molded to economically provide the complex configuration which provides the functions described.

It is to be noted that the groove 138 has a larger diameter than the groove 140. The springs 134, 136 are identical and both are expanded when mounted in the grooves 138, 140. The spring 134 thus exerts a radially inward force on the fingers 112, inwardly of the abutting surfaces 130, 132, and the spring 136 exerts a lesser radially inward force on the fingers 112, outwardly of the abutting surfaces 130, 132. When the fingers 112 are cammed outward to a release position (FIG. 13) the spring 138, being further from the hinge line defined by the notches 142, is expanded to a greater degree than the spring 136.

The use of two garter springs and the provision of means which expand both to the same extent in the release position, enable the use of garter springs which are interchangeable, and of minimum size, to the end of obtaining a compact construction.

As indicated, it is preferred that the major inward forces, resisting outward flexing of the fingers 112, be provided by the springs 134, 136. The described construction of the fingers 112 enables this end to be attained. It is further preferred that the spring forces supply at least approximately 70% of this inwardly force, which is a more specific end provided by the fingers 112, all within the abilities of one skilled in the art.

This is to say that the fingers 112 are thick enough to withstand the longitudinal stress thereon, with minimal stresses being induced when they are flexed to a release position. The primary inward force, resisting outward camming of the fingers is thus provided by the springs 134, 136. These springs can be economically manufactured to provide a given resilient force for a given elongation. Thus, a small tolerance can be obtained for the force at which the outlet coupler 64 will separate from the inlet coupler 62.

The angle of the abutting surfaces 130, 132, relative to the axis of the finger segments, is, preferably, approximately 50 deg. This angle, in combination with the described forces resisting outward displacement of the fingers 112, enables the outlet coupler 64 to be separated from the inlet coupler 64 in response to a tension force on the hose which is below the force which is below that which would create a serious hazard or significant damage to the dispenser 20.

Once the fingers 112 are flexed to the release position of FIG. 13, the outlet coupler 64 is readily pulled free from the inlet coupler 62. When this occurs, the poppet valve member 76 is urged, by spring 88, into sealing engagement with a seat 144 formed in the fuel passage 70. Similarly, poppet valve member 82 is urged into sealing engagement with a seat 146, by spring 90, formed in the fuel passage 74. Seating of the poppet valve members 76, 82 occurs before the pilot 91 is displaced from sealing relation with the bore 92. Thus, once separated, fuel cannot flow from either of the couplers 62, 64 and only an insignificant amount of fuel will spill from the separated couplers.

It is apparent from the foregoing description that the breakaway unit 48 will separate only in response to an axial, longitudinal pull on the outlet coupler 64. The flex section 50 is provided for the purpose of spacing the valve section 52 from the connection with a high hose dispenser in a manner such that the pull force on the hose 44 is transmitted as an axial force on the outlet coupler 64 to the end that there will be no binding forces to increase the force at which separation will occur.

The upper end of the flex section comprises (FIG. 4) the adapter 54 which is adapted to be attached a standard fitting mounted within the upper portion of the dispenser 40. The upper end of the bellows 58 comprises a sleeve which is secured to the adapter 54 by a band clamp 148. The hose 60 is secured to a hub 150 of the adapter 54, which is supported by spokes (not shown). Attachment of the hose 60 to the hub 150 may be provided through the use of a fitting 152 similar to the fitting 68 to which the lower end of the hose 60 is secured (FIG. 6).

The combined stiffness of the hose 60 and the bellows 58 is sufficient for the flex section 50 to bend on a curve which angles the valve section toward a drive away vehicle, when the spout is left in the fill pipe, as indicated in FIG. 1.

The length of the flex section is sufficient to provide a curvature which provides an axial transmission of force, as described. When the inlet coupler is released from the outlet coupler, upon the occurrence of a drive away, the upper, inlet coupler 62 whips around in an erratic fashion and has the potential for causing damage or injury. For this reason, the length of the flex section is maintained at the minimum necessary to obtain the desired curvature. A length of approximately 12 inches has been found preferable.

The compositely formed, coaxial hoses 44 may be any of several commercially available hoses, which have a relatively high tensile strength. The force required to release the outlet coupler 64 from the inlet coupler 62 is substantially less than a force which would rupture, or otherwise damage the hose 44.

Further this release force is set even lower so that a force, or pull, which could topple the dispenser, or otherwise cause it to be damaged, will not be applied through the hose. In a high hose dispenser (FIG. 1) this is a relatively low force due to the fact that the hose connection is (through the breakaway unit) is spaced a substantial distance from the mounting means at its base.

The latter requirement limits the release force for the breakaway unit to a value which is approached by the hydraulic hammer forces which are generated when delivery of fuel is interrupted by an automatic shut off valve which is commonly incorporated in fuel delivery nozzles. These valves are tripped by the fuel level in a fuel tank reaching a predetermined level, to thereby prevent spillage. The sudden closing of the valve results in a hydraulic hammer force which results in an axial force on the hose's connection with the breakaway unit which can be as high as 200 pounds, or, in some cases, even higher. These hammer pressure forces approach the force at which, in many cases, it is desired that the breakaway separate to prevent damage.

The described, releasable connection of the couplers 62, 64 enables the releasing force to be closely controlled so that it will release before exceeding the allowable pull on the dispenser, while at the same time preventing an undesired decoupling as the result of hydraulic hammer forces. There is a further advantage in that the described connection is such that its release force is not subject to variation as a consequence of fatigue stress. This is to say that the abutting lugs 114, 128 and the fingers 112 and springs 134, 136, are not stressed to a point where they would be weakened by repeated water hammer forces.

This leads to a description of a further feature of the present breakaway unit, namely, its capability of reuse after a drive away has occurred.

As indicted, the components providing the releasable connection are not damaged when a decoupling occurs. After decoupling, the inlet coupler 62 remains attached to the dispenser and the chances of damage to its components are remote, even though it may forcibly impact the structure of the dispenser. The outlet coupler 64, being attached to the hose 44, will be dragged along by the drive away vehicle. However the outlet coupler body 72 will be protected be the outer sleeve 106 (note FIG. 8) preventing damage to the locking lugs 114 and the poppet valve comprising member 82, as well as pilot 91, which is part of the means sealing the fuel passages 70, 74. In the usual case, the operator of a drive away vehicle quickly recognizes that he has forgotten to remove the nozzle from his fuel tank and drives only a short distance before stopping. The usual worst case is that the protective sleeve 102 will be damaged to the point where it will require replacement.

The structure now to be described enables the outlet coupler 64 to be readily reattached to the inlet coupler 62, to the end that the nozzle involved in the drive away may be quickly be placed back in service. The same structure also provides for initial connection of these couplers.

Referencing FIGS. 10 and 11, it will be seen that the spacing between the lugs 114 (fixed abutment means) is such that the lugs 128 (movable abutment means) may pass therebetween. Similarly, the lugs 128 are spaced apart a distance sufficient for the lugs 114 to pass therebetween. Thus, the outlet body 72 may be rotated to a position wherein the lugs 114, 128 are in offset relation. The pilot 91 is then telescoped into the bore 92 to a longitudinally aligned position, bringing the lug surfaces 132 to, or inwardly of, the lug surfaces 130. The coupler 64 is then rotated to bring the lugs 114, 128 into longitudinal alignment and lock the couplers together.

The couplers are maintained in this releasably locked position by an interlock 154 which is the form of a ring member longitudinally mounted on the outlet body 72. The interlock 154 has angularly spaced, longitudinal slots 156 which slidingly receive a second set of lugs 158 (FIG. 16, lower portion), which are, respectively, aligned with and spaced from the lugs 114. The interlock 154 is yielding maintained in engagement with the lugs 156 by a wave spring 160, which is disposed between the interlock and a flange 162 formed on an interior portion of the fitting 56. The interlock 154 is thus angularly positioned on the outlet body 72 while being yieldingly displaceable in a longitudinal direction.

The interlock 154 has an end face 164, facing the inner, mating end of the outlet coupler 64, with radial slots 166 formed therein. The radial slots 166, respectively, are adapted to receive end lugs 168 which project longitudinally outwardly from the fingers 112 (FIG. 12 and FIG. 16, upper portion). It will be seen from FIGS. 11 and 14 that the end lugs 168 are aligned with and form extensions of the releasable locking lugs 128.

In assembling the outlet coupler 64 on the inlet coupler 62, the lugs 128 are aligned with the spaces between the lugs 114 and the pilot 91 is telescoped within the bore 92 until the surfaces 130 are displaced into alignment with, or slightly past the abutment surfaces 132, as above indicated. During the final portion of this telescoping movement, the ends of end lugs 160 engage the end surfaces 164 of the interlock 154, compressing the spring 160. The outlet coupler 64 is then rotated to bring the lugs 128 into alignment with the lugs 114 and between the lugs 114 and the interlock lugs 158. Once this alignment is obtained, the outlet coupler 64 is released. The spring 160 then displaces the interlock so that the lugs 168 are captured in the radial, face slots 166. The outlet coupler 64 is thus readily brought to an operative, coupled position, requiring a minimum of effort, either in the initial assembly of the breakaway unit, or in restoring it to an operation condition, after a drive away incident.

In assembling the outlet coupler 64 to the inlet coupler 62, there can be a tendency for the fingers 112 to be displaced rearwardly relative to the sleeve 102. To prevent this from occurring, longitudinally extending lugs 169 project from the inlet coupler sleeve 102 into contiguous relation with the spring 134. Axially forces on the fingers 112 are resisted by the lugs 169 engaging the spring 134.

A further feature of the the present breakaway unit is in providing a positive electrical connection between the separable inlet and outlet couplers. This brings into focus a further requirement for the dispensing of fuel, namely, that a grounding connection is required between the fuel nozzle and the dispenser. It is common practice for fuel hoses to incorporate reenforcing wires to provide an electrical grounding flow path therethrough. The hose 60 would have this capability. Similarly, the fuel hose which would be connected to the fitting 56 would have the same grounding capability.

The fitting 68, inlet body 66 and the outlet body 72 and fitting 56 are, preferably, formed of metal so that there is, nominally, an electrical grounding flow path through the breakaway unit, which is completed by the metal adapter 54, to the dispenser. However, a possibility exists that the inlet body 66 could be electrically insulated from the outlet body 72 by the O-ring 98, should there be a failure of sufficient contact pressure between the pilot 91 and the bore 92.

In order that a grounding electrical flow path is assured, a metal, grounding washer 187 (FIGS. 6, 7 and 7A) is disposed between the end of the pilot 91 and the bottom of the bore 92. The grounding washer 187 is in the nature of a split lock washer, having ends that are normally, axially spaced. When the inlet coupler 62 and outlet coupler 64 are locked in assembled relation (FIG. 6), the washer 187 is resiliently compressed towards a flattened condition and positively maintains electrical contact with and between the inlet body 66 and the outlet body 72.

It will further be seen the the grounding washer 187 is captured in a groove 189 formed at the base of the bore 92. Thus when the outlet coupler 64 is separated from the inlet coupler 62, the grounding washer will not be lost and will automatically be in place upon reassembly of the couplers after a drive away has occurred.

SUMMARY OF OPERATION

Each of the nozzles 42 of the high hose fuel dispenser 40 (FIG. 1) is connected by a commerical length of coaxial hose 44 to a breakaway unit 48, which is connected thereto by a commercial, or standard adapter, received in the fitting 56. The breakaway unit is then mounted on the dispenser, by adapter 54, at an elevated position thereon. This arrangement provides a connection with a source of pressurized fuel for delivery into the fuel tank of a vehicle. The nozzle 42, hose 44 and breakaway unit 48 provide passageway means for the delivery of fuel and also provide a return passageway for returning fuel vapors to the dispenser 40 and internal conduit means therein which return the vapor to the fuel storage tank so that it does not contaminate the atmosphere.

The breakaway unit 48 serves no function in the normal delivery of fuel, except to provide the necessary passages for fuel delivery and the return of vapors.

When a drive away occurs, the nozzle, which remains in the fuel tank fill pipe, exerts a tension force on the hose 44 which is resisted by the connection of the of breakaway unit 48 to the dispenser 40. The flex section 50 bends so that the pull of the hose 44, is translated into an essentially pure, axial force on the valve section 52. The same result would be obtained if the hose 44 were caught on the vehicle's bumper.

This separation force is transmitted through the outlet coupler 64 and more specifically through lugs 114 which are aligned with the lugs 128, formed on the fingers 112. The fingers 112 are longitudinally locked on the inlet coupler 62 which in turn transmits this separating force, through hose 60, to the adapter 54 and the dispenser 40. The separating force may also be transmitted through the finger splines 120 to the inlet coupler sleeve 102, through the inner ends of the spline slots 122. The bellows 58 is connected to the sleeve 102, but does not serve a primary function in the transmission of the separation forces.

When the separation force resulting from a drive away, exceeds a predetermined value, the outer ends of the fingers 112 are flexed outwardly, by the abutting, camming surfaces 130, 132, acting against the inward forces of the springs 134, 136 and the resistance of the fingers 112 to flexing. Once the lugs 128 are flexed outwardly of the lugs 114 (release position), the outlet coupler is readily pulled free of the inlet coupler 62. As this occurs, the poppet valve members seal the fuel passages 70 and 74 prior to the pilot 91, and its sealing o-ring 98 being pulled free from the bore 90, so that there is but a minimal spillage of fuel when a drive away occurs.

After a drive away, the flex portion 50 and the inlet coupler 62 remain attached to the dispenser 40, without causing any damage to either to the dispenser or the those portions of the breakaway unit. Similarly, the outlet coupler 64 of the valve section 52, will, in most all cases, be capable of reuse after a drive away incident. As noted, the sleeve 106 protects the sealing and locking portions of the outlet section 64. Thus, the nozzle 42, hose 44 and outlet section 64, after recovery, can be quickly put back in service, simply by inserting the outlet coupler 64 into the inlet coupler 62 and rotating it to a locking position which is maintained by the interlock 154.

FIGS. 5, 18

FIGS. 5 and 18 illustrate an alternate embodiment breakaway unit 48' embodying a modified flex section 50', involving a different mode of attachment to the dispenser 40 and a different mode of attachment to the valve section 52.

The flex section 50' comprises a length of bellows tubing 58' and a length of fuel hose 60'. The tubing 58' and 60' may be commercially available items. The upper ends of the bellows tubing 58' and the fuel hose 60' are attached to a standard, male adapter which enables connections to be made with the fuel and vapor return conduits of the dispenser in the same fashion as described in connection with the flex section 50.

The hose 60' is connected to the inlet coupler body 66 in the same fashion as in the previous embodiment.

The bellows 58' is secured to the inlet coupler 62 through the use of accepted means for making a connection with a bellows. These means include spaced inner and outer sleeves 170, 172 between which the lower end portion of the bellows 58' is clamped, as be swaging.

The inlet coupler 62' has a modified outer sleeve 102' in which the lower end of the bellows mounting sleeve 172 is slidingly received. A snap ring 174 is mounted on the lower, outer end of the sleeve 172 and is engageable with a shoulder 176, on the sleeve 102' for the transmission of outward forces therebetween.

The slots 122', for receiving the finger splines 120 extend inwardly from the outer end of the sleeve 102' and are retained in these slots by a band 178. The band 178 extends around the inner surface of the sleeve 102' and has angularly spaced projections 180 which are received in openings 182 to lock the band 178 on the sleeve 102'. Axial forces may thus be transmitted from the coupler body 66 to the sleeve 102' through the splines 120.

The valve section 52, thus connected to the flex section 50' may be identical with the valve section described in connection with the first embodiment. Likewise the operation and function of this embodiment is identical with that of the previous embodiment.

FIG. 19

Reference is next made to FIG. 19 for a description of a breakaway unit 48" which simply comprises a valve section 52", the flex section of the previous embodiments being eliminated. The valve section 52" may comprises the same outlet coupler 64, previously described, and an inlet coupler 62" which may be identical with the previously described inlet coupler 62, except for the modified components now to be described.

The inlet coupler sleeve 102" is modified in the same fashion as the inlet coupler sleeve 102' described in connection with FIG. 18, in providing a connection with the finger splines 120. A band 178 is mounted within the lower end of the sleeve 102" to lock the splines 120 in the slots 122.

A fitting 186 is mounted on the inlet coupler body 66 by being threaded into the same hole which previously received the fitting 68. The fitting 186 may be identical with the fitting 56 and is adapted to receive a standarad, male coaxial hose adapter to make connections with the fuel passage and vapor passage of a coaxial hose. The inlet coupler sleeve 102" is further modified to be mounted on the fitting 186.

The breakaway unit 48" is particularly adapted for use in a so-called low hose dispenser 188, illustrated in FIG. 2. The form of low hose dispenser seen in FIG. 2 comprises, at a low height, a connection with a source of pressurized fuel and a return flow path for vapors. A first length of hose 190, connected to the dispenser 188 extends upwardly to a retractor 192 and then to the breakaway unit 48". The breakaway unit 48" is then connected to a dispensing nozzle 194 by a second length of coaxial hose 196.

When a drive away occurs, with the nozzle 194 lodged in vehicles fuel tank, the hoses are ultimately stretched to an essentially horizontal position so that an axial, tension force will be exerted on the breakaway unit 48". When this force reaches a predetermined limit, the outlet coupler 64 will be pulled free from the inlet coupler 62" in the same fashion as in the previous embodiments.

For low hose dispensers, the length of the hose 190, between the dispenser 188 and the breakaway unit 48" serves the function of a flex section. Thus a flex section is not provided as a component of the breakaway unit. Otherwise, the breakaway unit 48" functions in the same fashion to prevent spillage of fuel and permit ready reassembly, as has been previously described.

FIGS. 20-22

Reference is next made to a further embodiment of the invention illustrated in FIGS. 20-22 and generally indicated by reference character 248.

The breakaway unit 248 comprises a flex section 250 (FIG. 20) and a valve section 252. A fitting 254, at the free end of the flex section 250, provides for attachment of the breakaway unit on a dispenser, as in the first described embodiment. Likewise, a fitting 256 is provided at the opposite end of the breakaway unit 248 for connection with a coaxial fuel/vapor hose. The main portion of the flex section 250 comprises an outer bellows 258 and an inner hose 260. The inner hose 260 provides the fuel flow passage and the hose 260 and bellows 258 define an annular, vapor return flow passage.

The valve section 252 comprises an inlet coupler 262 and an outlet coupler 264 which are shown in position for initial assembly in FIG. 20 and in their assembled relation in FIG. 22.

The inlet coupler 262 includes an inlet body 266 into which a fitting 268 is threaded. Hose 260 is telescoped into the fitting 268 to form a fluid tight connection therewith and to provide communication with an internal fuel flow passage 270. The outlet coupler 264 comprises an outlet body 272 into which the fitting 256 is threaded. The outlet body has a central fuel passage 274 which is connected to the central fuel hose of the coaxial hose connected thereto by the fitting 256.

The interior configuration of the fuel passageways 270, 274 may be the same as in the previous embodiments, with poppet valves 276, 282, respectively, controlling fuel flow therethrough in the same fashion.

A pilot 291, defining the free, mating end of the inlet body 266, is received within a bore 292 formed in the free end of the outlet body 272. O-ring 298 provides a seal between the pilot 291 and the bore 292.

In the present embodiment, outer bounds of the vapor passage, through the valve section, is provided by a sleeve 300 formed integrally with the bellows 258 and an outlet sleeve 306 which, in turned is mounted on the fitting 256. The inner bounds of the vapor flow path is defined by inlet body 266, the outlet body 272 and a fitting hub 308.

The inlet coupler 262 and outlet coupler 264 are held in assembled relation by a plurality of longitudinally extending fingers 312 which extend from the outlet body 272 and are adapted to be telescoped over the adjacent end of the inlet body 266. A groove 314, formed in the outer surface of the inlet body 266 provides a fixed abutment thereon. The fingers 312 have abutments 328 at their outer ends which are seated in the groove 314 when the couplers 262, 264 are in their assembled relation. Groove 314 provides an abutment surface 330 which are engaged by abutting surfaces 332 on the finger abutments 328.

The fingers 312 are formed as components of a connector member 333 which comprises a central, cylindrical, shell portion 335 and anchoring fingers 337. The outlet body 272 has an annular groove 318 which receives lugs 316 formed on the anchoring fingers 337. The connector member 333 is, advantageously, molded from a resinous material, delrin being exemplary.

The outer ends of the lugs 316 are angled to facilitate flexing of the anchoring fingers 337 as they are telescoped over the outlet body 272 in mounting the connector member 333 thereon. The inner ends of the lugs 316 are disposed at right angles to the axis of the body, so that they will be longitudinally locked thereon when an outward tension force is applied to the inlet coupler 264, which would tend to separate it from the inlet coupler 262.

In this embodiment, a single garter spring 334 embraces the outer ends of the fingers 312 and is received in a groove 338 formed therein. The spring 334 provides a resilient force which maintains the finger abutments 328 in the groove 314, when the couplers are in their assembled relation.

The means, now to be described, provide for assembly of the inlet coupler 262 and the outlet coupler 264.

The couplers 262 may be manually positioned with the angled, outer ends of the finger abutments 328 engaging a correspondingly sloped, conical surface on the inlet body 266. The bellows sleeve 300 has inwardly projecting lugs 339 which prevent the sleeve 300 from fully telescoping over the outlet sleeve 306 during assembly, as indicated in FIG. 20. Leverage slots 341, in the outer end portion of the outlet sleeve 306 are thus exposed so that a screw driver blade, or similar prying device, may be inserted therethrough to engage an annular slot 343 formed in the inlet body 266, as indicated in FIG. 20.

The screw driver is then pivoted in a counter clockwise direction to displace the outlet coupler 264 towards the inlet coupler 262. The screw driver has a length substantially greater than the distance between the outlet sleeve 306 and the inlet body 266 so that a leverage affect is obtained which minimizes the manual force that must be applied to the screw driver in assembling the couplers of the breakaway unit 248.

The force required to telescope the couplers into assembled relationship is directly proportional to the force required to spreading the fingers 312 so that they will pass over the inlet body portion 345. This spreading action is resisted by the force required to flex the fingers 312 and as well as by the force required to expand the garter spring 334. The angled surfaces of the finger abutments 328 and the inlet body 266 provide a camming action which further minimizes the manual force that must be applied to the screw driver in expanding the fingers 312.

FIG. 21 illustrates the fingers 312 in their expanded condition (release position), with the couplers in a partially assembled relation.

FIG. 22 illustrates the couplers 262, 264 in their fully assembled relation, which is obtained by continued pivoting of the screw driver, the screw driver having been removed after this position has been obtained. The bellows sleeve 300 is telescoped over the end portion of the outlet sleeve 306 and is longitudinally secured in this position by the lugs 339 entering the slots 341.

The releasable locking action provided by the fingers 312 is equivalent to that of the fingers 112 in the first described embodiment. The groove abutment surface 330 and the finger abutment surfaces 332 are angled to provide a camming action which will flex the fingers outwardly to a release position, in response to a predetermined, axial separating force exerted on the inlet coupler 264, as would occur when a vehicle is driven away from a dispensing unit with the nozzle lodged in its fuel tank fill pipe. In such event, the poppet valves 276, 282 automatically close to prevent spillage of fuel.

It is to be noted that the locking components of the outlet coupler 264 will be protected from damage by the sleeve 306, as the outlet coupler 264 is dragged along the ground by the drive away vehicle. Thus, after the breakaway unit 248 is decoupled by a drive away, it will be capable of reassembly so that the dispensing unit, with which it is associated, may be quickly be put back in service. This reassembly is accomplished, with a minimum of manual effort, through the use of a screw driver, as above described.

FIGS. 23–25

Reference is next made to FIGS. 23–25 for a description of another embodiment of the invention, which is indicated generally by reference character 448.

The breakaway unit 448 comprises a flex section 450 (FIG. 23) and a valve section 452. A fitting 454, at the free end of the flex section 450, provides for attachment of the breakaway unit 448 on a dispenser, as in the first described embodiment. Likewise, a fitting 456 is provided at the opposite end of the breakaway unit 448 for connection with a coaxial fuel/vapor hose. The main portion of the flex section 450 comprises an outer bellows 458 and an inner hose 460. The inner hose 460 provides a fuel flow passage and the hose 460 and bellows 458 define an annular, vapor return flow passage.

The valve section 452 comprises an inlet coupler 462 and an outlet coupler 464 which are shown in their assembled relation in FIG. 23.

The inlet coupler 462 includes an inlet body 466 into which fitting 468 is threaded. Hose 460 is telescoped over the fitting 468 to form a fluid tight connection therewith and to provide communication with an internal fuel flow passage 470. The outlet coupler 464 comprises an outlet body 472 into which the fitting 456 is threaded. The outlet body has a central fuel passage 474 which is connected to the central fuel hose of the hose connected thereto by the fitting 456.

The interior configuration of the fuel passageways 470, 474 may be the same as in the previous embodiments, with poppet valves 476, 482, respectively, controlling fuel flow therethrough in the same fashion.

A pilot 491, defining the free end of the outlet body 472, is received within a bore 492 formed in the free end of the inlet body 466. O-ring 498 provides a seal between the pilot 491 and the bore 492.

In the present embodiment, outer bounds of the vapor passage, through the valve section, is provided by a conical sleeve 500, formed integrally with the bellows 458 and extending coaxially of the inlet body 466. The conical sleeve 500 is secured to an inlet coupler sleeve 502 by a band clamp 504. The sleeve 502 has a plurality of radial vanes 520 (three equiangularly spaced vanes are sufficient) which are slidably received (for assembly purposes) on the outer surface of the inlet body 466. The vanes 520 are axially positioned relative to the inlet body 466 between a shoulder 521 and a snap ring 523. The vanes 520 maintain the inlet body centrally of the inlet sleeve 502, with a fixed axial relation therebetween, while providing a passageway therebetween.

The inlet coupler sleeve 502 is telescoped within an outlet sleeve 506 which, in turned is mounted on the fitting 456, being held in place by an interference fit with wedge grooves in the telescoped portions thereof. The fitting 456 may be functionally equivalent to the previously described fitting 56. The conical sleeve 500, the inlet sleeve 502, the outlet sleeve 506 and the fitting 456 define the outer bounds of the vapor flow path. O-ring 510 provides a seal between the telescoped sleeves 502 and 506. The inner bounds of the vapor flow path is defined by inlet body 466, the outlet body 472 and the fitting 456.

The breakaway unit 448 includes means for releasably locking the inlet and outlet couplers in assembled relation. These means comprise a circumferential groove 514 formed in the outlet body 472. A pair of diametrically opposed, locking rollers 528 are disposed in the groove 514. The locking rollers 528 are mounted in wings 529 which extend in overlying relation to the groove 514 and may be formed integrally with the inlet body 466. The locking rollers 528 are, respectively, disposed in transverse slots 531 formed in the wings 529. A second pressure roller 533 is disposed in each of the slots 531. The rollers 533 have pintels 535. Tension springs 537, are, respectively, hooked onto the pintels 535, at the opposite ends of the rollers 533.

Referencing FIG. 25, in particular, it will be seen that each roller 533 bears against a vertical wall of the slot 531 and the locking roller 528 in the slot. The springs 537 provide a radially inward force F on each roller 529 which is transmitted to the adjacent locking roller 528, as indicated by force vector F'. This results in force vectors L, L' which, respectively, cause the locking roller to bear against the bottom of the groove 514 and abutment surface 530, of the groove 514.

When a separating force is exerted on the outlet coupler 464, there is a longitudinal force S tending to displace the outlet body 472 in the same direction relative to the inlet body 466 and the wings 529 in particular. This force is resisted by the horizontal component of vector L'. When force S exceeds the horizontal component of L', the locking rollers 528 are cammed outwardly relative to the abutment surface 530. As shown in FIG. 25, this results in a counter clockwise rolling movement of the locking roller 528 relative to the surface 530. This rolling movement is transmitted to the pressure rollers 529 which then rotate in a clockwise direction, as it is likewise displaced outwardly. The clockwise rotation of the pressure roller 529 results in rolling movement thereof relative to the surface of the slot 531 which it engages.

Thus, the forces resisting separation of the outlet coupler 464 from the inlet coupler 462 are substantially independent of friction affects and are, more directly, a function of the characteristics of the springs 537. Tension springs can be manufactured, with a reasonable expense, to accurately provide a given force for a given degree of elongation. Thus it is possible to obtain a smaller tolerance in the force required to separate the couplers, thereby providing a greater assurance that separation will occur before the force on the hose is great enough to cause damage, and at the same time prevent undesired separation as a result of hydraulic, water hammer, affects.

After separation by a drive away, the outlet coupler 464 is, again, protected by the outlet sleeve 506 so that it may be recovered and reassembled with the inlet coupler 462. This may be done simply by telescoping the outlet coupler 264 onto the inlet coupler. In so doing, the pressure rollers 528 must be displaced outward over the abutment means provided by the groove 514. To facilitate this displacement of the pressure rollers 528, a conical surface 542 is provided between the pilot 491 and the groove 514. The conical surface 542 cams the pressure rollers 528 outwardly and minimizes the force necessary to telescope the couplers into assembled relation. The described rolling movement of the locking rollers 528 and pressure rollers 533 reduces friction forces in reassembly and thus minimizes the manual effort required. The couplers would be initially assembled in the same fashion.

FIGS. 26-28

Reference is next made to FIGS. 26-28 for a description of a further breakaway unit, which is indicated generally by reference character 448'. The breakaway unit 448' differs from the breakaway unit 448 primarily in the means for releasably locking the inlet coupler and the outlet coupler in assembled relation. Components of the breakaway unit 448', which are unmodified, or essentially unmodified, from those employed in the breakaway unit 448 are identified by the same reference characters and description thereof is not repeated.

In this embodiment, the vanes 520' are captured between the snap ring 523 and wings 529' and, preferably. Preferably, a greater number of vanes 520', representatively 6, are employed.

The releasable locking means, again, comprise a circumferential groove 514 formed in the outlet body 472. diametrically opposed, locking rollers 528' are disposed in the groove 514. The locking rollers 528' are also disposed, respectively, in slots 531' formed in wings 529' which are integral with the inlet body 466. The locking rollers 528' are rotatably mounted on pins 540. The pins 540 are connected, at their opposite ends, by springs 537' which provided a radially inward force holding the rollers 528' in the groove 514.

The locking rollers 528' serve the same function as the rollers 528 in preventing separation of the outlet coupler 464 from the inlet coupler until the separation force exceeds a predetermined value. When this value is exceeded the rollers 528' are cammed outwardly by the abutment surface 530 of groove 514, against the action of springs 537'.

It is appreciated that, as the rollers 528' are cammed outwardly, they roll on the abutment surface 530, the upper roller in FIG. 26, rotates in a counter clockwise direction, as it rolls outwardly on the surface 530. The locking rollers 528' bear against the opposed surface of the slot 531' in resisting separation of the outlet coupler 264 from the inlet coupler 262 and as they are cammed outwardly to a release position. The direction of rotation of the rollers 528' results in sliding movement between the rollers 528' and the slot 531'. This sliding friction is minimized by forming the roller 528' as three elements so that rotation is imparted to only the central element, thereby minimizing sliding movement relative to the slot 531'. While there are friction forces that are otherwise eliminated in the breakaway unit 448, of FIGS. 23-25, economies of construction make the breakaway unit 448' an attractive alternative where a small tolerance in separation force is not a prime requirement.

After separation by a drive away, or in initial assembly, the outlet coupler 464 is telescoped onto the inlet coupler 464, in the same fashion described in connection with the breakaway unit 448.

FIGS. 29-32

Reference is next made to FIGS. 29-32 for a description of yet another breakaway unit, generally identified by reference character 648.

The breakaway unit 648 may comprise the same flex section 450, as employed in the previous two embodiments, with the components thereof identified by the same reference characters as employed in those embodiments. The flex section is connected to a valve section 652 which comprises an inlet coupler 662 and an outlet coupler 664.

The inlet coupler 662 includes an inlet body 666 into which the fitting 468 is threaded to connect the hose 460 thereto and provide communication with an internal fuel flow passage 670. The outlet coupler 664 comprises an outlet body 672 into which a fitting 656 is threaded. The outlet body 672 has a central fuel passage 674 which is connected to the central fuel hose of the hose connected thereto by the fitting 656.

The interior configuration of the fuel passageways 670, 674 may be the same as in the previous embodiments, with poppet valves 676, 682, respectively, controlling fuel flow therethrough in the same fashion.

A pilot 691, defining the free end of the inlet body 666, is received within a bore 692 formed in the free end of the inlet body 666. O-ring 698 provides a seal between the pilot 691 and the bore 692.

The conical sleeve 500 of bellows 458 is secured to an inlet coupler sleeve 702 by band clamp 504. The inlet coupler sleeve 702 is telescoped within an outlet sleeve 706 which, in turned is mounted on the fitting 656, being held in place by an interference fit with wedge grooves in the telescoped portions thereof, as in the previously described embodiments. The fitting 656 may be functionally equivalent to outlet coupler fittings previously described. The conical sleeve 500, the inlet sleeve 702, the outlet sleeve 706 and the fitting 656 define the outer bounds of the vapor flow path. O-ring 710 provides a seal between the telescoped sleeves 702 and 706. The inner bounds of the vapor flow path is defined by inlet body 666, the outlet body 672 and a hub within fitting 656.

The outlet coupler 646 is releasably locked in the illustrated assembled relation with the inlet coupler 642 by the means now to be described.

The outlet body 672 has a circumferential groove 714. A pair of diametrically opposed rollers 728 are yieldingly maintained in the groove 714 by torsion springs 737. The torsion springs 737 each comprise a coil portion 739, angled, longitudinally extending legs 741, with transverse end portions 743. The coil portions 739 are, respectively, mounted on bosses 745 which project laterally from the inlet body 666. The end portions 743 of one of the springs 737 enter one end of holes extending axially through the rollers 728. The end portions 743 of the other spring 737 enter the opposite ends of the holes through the rollers 728. The rollers 728 are thus rotatably mounted on the spring end portions 743 and resiliently held in engagement with the groove 714.

Means for positioning the inlet body 666 centrally of the inlet sleeve 702 comprise plugs 729 which are inserted into the hollow bosses 745. The plugs have outward flanges 731 which are captured between the sleeve 702 and the conical sleeve 500. The plugs 729 provide the spacing and axial positioning functions of the vanes 520, 520' of the preceding embodiments.

The plugs 729 are force fitted into the bosses 745 and provided with flanges which overlie the coil portions 739 of the springs 737, to thereby provide means for maintaining these springs in assembled relation.

Separation of the outlet coupling 664 from the inlet coupling 662 is resisted by the rollers 728 engaging an abutment surface 730 provided by the groove 714. The abutment surface 730 is disposed at an angle to cam the rollers 728 outwardly to a release position, when the separation force exceeds a predetermined level, as would be the case in the event of a drive away.

The releasable locking means of this embodiment also provide a releasing force that is substantially independent of friction forces and is controlled primarily by the springs 737. The springs 737 are capable of being economically manufactured so that there is a given force resisting a given displacement of their legs 741. Thus a small tolerance is provided for the separating force which frees the outlet coupler from the inlet coupler.

The features of the present invention are particularly adapted for use with high hose fuel dispensers having vapor recovery capability. However, as will be apparent to those skilled in the art, many of these features will have utility in fuel hose breakaway units employed with other types of dispensers, which do not necessarily provide for vapor recovery.

Those features provide several ends including a small tolerance in the force at which an outlet coupler will be separated from an inlet coupler, while at the same time permitting the couplers to be reassembled after a drive away has occurred. This end is economically attained through the use of separate spring means to provide at least the major portion of resilient means which must be overcome to displace moveable abutment means to a release position. Further accuracy, or minimization of the tolerance in the force at which separation occurs is attained through the minimization of friction forces acting on the moveable abutment means as they are displaced to a release position.

Another end attained by the present invention is to facilitate reassembly of a breakaway unit after it has been separated by a drive away. This end may be attained angularly spacing fixed and moveable abutment means which may be freely telescoped and then rotated to a locking position. Alternatively means can be provided for facilitating displacement of moveable abutment means to a release position to permit reassembly. The means for facilitating such displacement may include reducing friction forces involved in so displacing the moveable abutment means and the provision of means for providing a mechanical advantage for the force manually applied in telescoping inlet and outlet couplers to an assembled relation.

Other features are found in the provision of a flex section which assures that the pull on a fuel hose will be translated into an axial separating force on the breakaway unit. Further features are found in the protection of the outlet coupler from damage as it is dragged along the ground by a drive away vehicle.

The several embodiments disclosed herein illustrate these features in various combinations, employing preferred structural configurations. Those skilled in the art will appreciate that these features can be employed in other combinations and with structural configurations modified from what is disclosed herein within the spirit of the present invention. The scope of the invention is, therefore, to be derived from the following claims.

Having thus described the invention, what is claimed as novel and desired to be secured by Letters Patent of the United States is:

1. A fuel hose, breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle, said breakaway unit comprising
a valve section having
an inlet coupler,
an outlet coupler adapted for fluid connection with hose means extending to the fuel nozzle, and
means for releasably locking said couplers in assembled relation, said locking means being responsive to an axial tension force to permit separation of the couplers,
said couplers each having
a fuel passage and
valve means which automatically shift from an open position to a closed position when the couplers are separated,
wherein
the inlet coupler and outlet coupler, when separated, are alignable in a relative angular relation in which the locking means are offset to a position permitting the couplers to be longitudinally shifted into a telescoped relation, and
the couplers, when so telescoped, are relatively rotatable to a position in which the locking means releasably lock the couplers in their assembled relation,
characterized in that
one coupler has a cylindrical portion,
the locking means comprises
a plurality of fixed abutment lugs projecting from said cylindrical portion in angular spaced relation to define openings therebetween, and
a plurality of moveable abutment lugs, carried by the other of said couplers and having a width less than distance between the fixed abutment lugs and, respectively, alignable with the openings therebetween,
whereby the couplers may be longitudinally displaced to a position wherein the moveable abutment lugs may be rotated into locking engagement with the inner abutement lugs.

2. A fuel hose, breakaway unit as in claim 1 further comprising
interlock means longitudinally displaceable relative to said one coupler member,
means preventing relative rotation between said interlock means and said one coupler, and
means preventing relative rotation between the interlock means and said other coupler once the couplers have been rotated to a position wherein said lugs are in locking engagement.

3. A fuel hose, breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle, where the fuel nozzle has means for recovering vapor generated during the delivery of fuel and the hose is a coaxial hose having a central fuel passage and a coaxial vapor return passage, said breakaway unit comprising a valve section having an inlet coupler, an outlet coupler, and means for releasably locking said couplers in assembled relation, said locking means being responsive to an axial tension force to permit separation of the couplers, said inlet coupler comprising an inlet body having a central fuel passage and an inlet sleeve spaced laterally outwardly from the inlet body and defining, at least in part, the outer bounds of an inlet coupler vapor passage, said outlet coupler comprising an outlet body having a central fuel passage and an outlet sleeve spaced laterally outwardly from the outlet body and defining, at least in part, the outer bounds of an outlet coupler vapor passage, said inlet and outlet sleeves being telescoped in sealing relation in the assembled relation of the couplers, valve means for the fuel passages, which automatically shift from an open position to a closed position when the couplers are separated, said locking means being carried by the inlet body and outlet body and responsive to and exert forces through said inlet and outlet bodies and the outer end of the outlet sleeve extends beyond the outer end of the outlet body, wherein the releasable locking means are disposed in the coupler, vapor passages and comprise fixed abutment means on one of said bodies moveable abutment means on the other of said bodies, and yieldable means maintaining said abutment means in an engaged position preventing separation of the outlet coupler from the inlet coupler, said moveable abutment means being displaceable out of engagement with the fixed abutment means, against the force of the yieldable means, in response to a predetermined axial force on said outlet coupler, and wherein the locking means comprise a plurality of fingers extending longitudinally of the inlet body, the fixed abutment means comprise surface means formed on the outlet body, in the assembled relation of the couplers, the fingers overlie the fixed abutment surface means and have abutment surface means, which provide the moveable abutment and are engageable with the fixed abutment surface means, said surface means being disposed on an angle such that the abutment surface means of the fingers will be flexed to a release position, away from and out of engagement with the fixed abutment surface means in response to a predetermined longitudinal tension force on the outlet coupler characterized in that the fingers have outwardly projecting splines and the inlet sleeve has longitudinal slots into which the splines project, thereby maintaining the inlet sleeve in spaced relation to the inlet body.

4. A fuel hose, breakaway unit as in claim 3 wherein the inlet body comprises a cylindrical portion having a circumferential groove therein, each finger has a cross section in the form of an annular segment having a given included angle, with the inner end portions of the fingers lying against said cylindrical portion, the side edges of the fingers are disposed in contiguous relation, and each finger has a longitudinal spline extending radially outwardly from each of its side edges at inner end thereof, the splines of adjacent fingers projecting into one of the slots formed in the inlet sleeve and each finger has an inwardly projecting lip projecting into the groove in the inlet body to longitudinally lock the finger thereto.

5. A fuel hose, breakaway unit as in claim 4 wherein the outer side surfaces of the adjacent splines of adjacent fingers are angled away from each other in the direction of the sleeve slots.

6. A fuel hose, breakaway unit as in claim 5 wherein the outer end surfaces of the splines are angled inwardly toward their outer surfaces.

7. A fuel hose, breakaway unit as in claim 4 wherein the side edges of each finger are notched to provide a weakened section about which the outer portion of the finger flexes and the yieldable means comprise garter spring means encircling the outer ends of the fingers and providing the major portion of the inward force resisting flexing of the fingers to a release position.

8. A fuel hose, breakaway unit as in claim 7 wherein a pair of annular spring grooves is compositely defined by the outer surface of the fingers, one of said grooves being disposed inwardly of the abutment surfaces of the fingers and the other of said grooves being disposed outwardly of said abutment surfaces, and the garter spring means comprise a pair of springs respectively disposed in said grooves.

9. A fuel hose, breakaway unit as in claim 8 wherein the inner diameter of the outer spring groove is less than the inner diameter of the inner spring groove, and the garter springs are substantially indentical.

10. A fuel hose, breakaway unit as in claim 7 wherein the outlet body has a cylindrical portion and a plurality of fixed lugs, equal in number to the number of fingers, project outwardly to provide the fixed abutment surface means, said lugs being angularly spaced to define openings therebetween, said fingers overlie said fixed lugs and have inwardly projecting lugs providing said abutting surfaces for the fingers, said inwardly projecting lugs having a width less than the width of the opening between said fixed lugs, whereby, the inlet and outlet coupler may be assembled by telescoping the finger lugs between the body lugs and then one coupler may be rotated relative to the other coupler to bring the finger lugs into alignment with the fixed lugs.

11. A fuel hose, breakaway unit as in claim 10 wherein each finger has a longitudinal lug projecting therefrom, and the inlet body has second lug means projecting therefrom, and further comprising an interlock ring longitudinally mounted on said outlet body, said interlock ring having longitudinal slot means receiving said second lug means to prevent relative rotation between the interlock ring and the outlet body, said interlock ring having slots in its end face which are adapted to receive the longitudinal finger lugs, and spring means urging the interlock ring in an outward direction, relative to the outlet body, said longitudinal finger lugs being aligned with the end face of the interlock ring when the inwardly projecting finger lugs are telescoped between the outlet body lugs, whereby the interlock ring will be displaced against the action of the spring means when the inwardly projecting finger lugs are so telescoped and then, when the couplers are relatively rotated to bring the inwardly projecting finger lugs into engagement with the body lugs, the interlock ring will be automatically capture the longitudinal finger lugs in the end face slots and prevent relative rotation between the inlet and outlet couplers.

12. A fuel hose, breakaway unit as in claim 13 wherein a bore is formed in the outer end of the inlet coupler, the outlet body has a pilot, at its outer end, which is sealingly received by said bore to provide for fuel flow from the inlet coupler to the outlet coupler, the valve means comprise an inlet poppet mounted in the fuel passage of the inlet coupler, an outlet poppet mounted in the fuel passage of the outlet coupler, and means for yieldingly urging each of the poppets outwardly of the respective couplers to sealing positions, said poppets having outwardly projecting stems which engage each other in the assembled relation of the couplers to maintain said poppets in open positions, further characterized in that, when the couplers are separated, the stem of the inlet poppet does not project beyond the end of the inlet body, and the stem of the outlet poppet does not project beyond the end of the outlet body.

13. A fuel hose, breakaway unit as in claim 10 wherein the outlet coupler further includes a fitting adapted to receive an adapter and connect the breakaway unit to a coaxial hose, said fitting being mounted on said outlet body, and said outlet sleeve being mounted on said fitting, and the fitting has an outwardly projecting flange and the spring means acting on the interlock ring comprise a wave spring disposed between the interlock ring and said outwardly projecting flange.

14. A fuel hose, breakaway unit as in claim 4 further comprising a flex section connected at one end to inlet coupler and having, at its other end, an adapter which is adapted to be mounted on a fitting on the dispenser to provide separate, communication with a source of pressurized fuel and return means for the vapors, said flex section comprising a central fuel hose extending between the adapter and the inlet body, and an outer tube disposed in spaced relation to said fuel hose to define a flex section vapor passage, with one end thereof mounted on the inlet sleeve and its other end mounted on the adapter.

15. A fuel hose, breakaway unit as in claim 14 wherein the flex section tube is corrugated and has non-corrugated sleeves at its opposite ends said non-corrugated sleeves being, respectively, telescoped over the adapter and the inlet sleeve, and means clamp said non-corrugated sleeves, respectively, to the adapter and inlet sleeve.

16. A fuel hose, breakaway unit as in claim 14 wherein the flex section tube is corrugated and further including means for clamping one end of the corrugated tube on said adapter, and means for securing the other end of the corrugated tube to said inlet sleeve including a connector sleeve telescopingly received by said inlet sleeve and having an inner connector sleeve between which the other end of the corrugated tube is captured. .

17. A fuel hose, breakaway unit as in claim 3 wherein the slots in the inlet sleeve terminate in ends spaced from the outer end of the inlet sleeve, thereby limiting outward longitudinal movement of the splines and inlet body relative to the inlet sleeve.

18. A fuel hose, breakaway unit as in claim 15 where the flex abutment means has a relatively steep angle requiring a relatively high longitudinal, outward force to separate the outlet coupler from the inlet coupler, the outer end portion of said one body is sloped inwardly from said fixed abutment means at a relatively shallow angle, said moveable abutment means being engageable with and displaced by said sloped outer end portion as the couplers are longitudinally displaced towards an assembled relation, whereby the couplers may be assembled with the use of a relatively low force, and further comprising means for providing a leverage force between the inlet coupler and the outlet coupler to effect longitudinal movement of the couplers toward an assembled relation to thereby reduce the force required to displace the moveable abutment means during assembly of the couplers.

19. A fuel hose, breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle, said breakaway unit comprising an inlet coupler, an outlet coupler, and
means for releasably locking said couplers in assembled relation, said locking means being responsive to an axial tension force to permit separation of the couplers,
wherein
the releasable locking means comprising
fixed abutment means on one of said couplers, and
a plurality of fingers extending longitudinally from the other of said couplers,
said fingers and said abutment means, in the assembled relation of the couplers, having engaged abutment surface means, preventing axial separation of the couplers,
resilient means for maintaining said surface means in engaged relation,
said fingers, in the assembled condition of the couplers, being free to flex to a position in which the surfaces means are disengaged, to permit separation of the couplers,
said surface means having an angular relation tending to provide separation thereof, in response to an axial separation force on said couplers,
wherein
separate spring means providing at least the major portion of the resilient means maintaining said surface means in an engaged position,
wherein
the spring means comprise
garter spring means embracing the outer portions of the free ends of said locking fingers.
the fixed abutment means comprise abutment angled surface means facing away from said other coupler,
the locking fingers have surface means formed on approximately the same angle and engaging the surface means of the fixed abutment means, when the couplers are in assembled relation, and
the garter spring means comprise
two garter springs,
characterized in that
a pair of circumferential groove means are formed on the outer surfaces of said locking fingers, said pair of groove means being longitudinally spaced on opposite sides of said finger surface means, and
the garter springs are positioned, respectively, in said groove means.

20. A fuel hose, breakaway unit as in claim 19 wherein
the outer of said pair of groove means in deeper than the inner groove means and
the groove means have approximately the same diameter when the fingers are flexed to the release position, and
the garter springs have approximately the same resilient characteristics,
whereby, the springs may be interchangeably disposed in said grooves and the force of each which resists displacement of the fingers, at the release position of the fingers, will be approximately equal.

21. A fuel hose, breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle,
said breakaway unit comprising
an inlet coupler,
an outlet coupler, and
means for releasably locking said couplers in an assembled relation,
said releasable locking means comprising
fixed abutment means formed on one of said couplers,
moveable abutment means, carried by the other of said couplers and having a locking position in which the abutment means are engaged to prevent longitudinal separation of the couplers,
said abutment means including means for camming said moveable abutment means from said locking position to a release position in which the couplers may be separated,
said camming means being responsive to a separating force on said outlet coupler to displace the moveable abutment means to the release position,
characterized in that
the fixed abutment means are angularly spaced,
the moveable abutment means comprise a plurality of angularly spaced abutment elements,
the moveable abutment elements have a width permitting them to pass between the angularly spaced, fixed abutment means, to a telescoped position longitudinally aligned with said locking position, and
the fixed and moveable abutment means are relatively rotatable from the telescoped position to the assembled position,
thereby providing for assembly of the couplers with a minimum of effort.

22. A fuel hose, breakaway unit as in claim 21 further comprising
means for preventing relative rotation between the fixed and moveable abutment means when the couplers are in the assembled relation.

23. A fuel hose, breakway unit as in claim 21 wherein
the fixed abutment means comprises angularly spaced, fixed lugs,
the moveable abutment means comprise
a plurality of longitudinal, locking fingers having inwardly facing lugs, respectively, engaged with said fixed lugs in the locking position.

24. A fuel hose, breakaway unit as in claim 23 further comprising
an interlock ring mounted on said one coupler for longitudinal movement relative thereto,
means preventing rotation of said interlock ring relative to said one coupler, and
cooperating notch and lug means which are engaged when the locking fingers are in the locking position and prevent relative rotation of the locking fingers relative to the interlock ring.

25. A fuel hose, breakaway unit as in claim 23 wherein
the angularly spaced lugs of the fixed abutment means are on the outlet coupler, and
the fingers of the moveable abutment means are carried by the inlet coupler.

26. A fuel hose, breakaway unit as in claim 25 further comprising
an interlock ring mounted on said inlet coupler for longitudinal movement relative thereto inwardly of said fixed abutment lugs,
a plurality of lugs projecting from said inlet coupler and providing means preventing rotation of said interlock ring relative to said inlet coupler, and
spring means urging said locking ring towards said locking lugs, said interlock ring having notches which are aligned with the fixed abutment lugs and receive the ends of the fingers, in the locking position, thereby preventing rotation of the fingers relative to the interlock ring.

27. A fuel hose breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle, where the fuel nozzle has means for recovering vapor generated during the delivery of gasoline and the hose is a coaxial hose having a central fuel hose and a coaxial vapor return passage, said breakaway unit comprising an inlet coupler comprising an inlet body having a central fuel passage, an outlet coupler comprising an outlet body having a central fuel passage, means for connecting at least one of said bodies to the central fuel hose of a coaxial hose.

said fuel passages being in flow communication in an assembled relation of the couplers, means for releasably locking said couplers in the assembled relation, said locking means being responsive to a longitudinal force of predetermined magnitude to release the outlet coupler from the inlet coupler, and sleeve means spaced outwardly from the inlet and outlet bodies and defining, in combination therewith, a vapor return passage, wherein the locking means are effective on and between the inlet body and the outlet body, and wherein the inlet coupler comprises an inlet sleeve, and vane means mounting the inlet sleeve on the inlet body, the outlet coupler comprises an outlet fitting mounted on the outlet body and an outlet sleeve mounted on the outlet fitting, said inlet sleeve and outlet sleeve being telescoped to provide a seal for the outer bounds of the vapor return passage, characterized in that the means for releasably locking said couplers in an assembled relation, comprise fixed abutment means formed on the outlet coupler body, longitudinally extending, locking fingers mounted on the inlet coupler, said locking fingers having moveable abutment means which engage the fixed abutment means to prevent longitudinal separation of the couplers, said abutment means including means for camming said moveable abutment means to a release position in which the couplers may be separated, and resilient means providing a force resisting displacement of the moveable abutment means to the release position, said camming means being responsive to a separating force on said outlet coupler exceeding a predetermined value, to displace the moveable abutment means to the release position, further characterized in that the vane means are formed integrally with said fingers.

28. A fuel hose, breakaway unit as in claim 27 wherein the inlet body has a circumferential groove, each finger has an inwardly projecting lug engaging said groove and longitudinally positioning the finger relative to the inlet body, and at its opposite side edges, radially extending splines, said inlet sleeve having, on its inner surface, longitudinal grooves, the splines of adjacent fingers being, respectively, received in said grooves to provide said vanes, and means for longitudinally locking said splines relative to said inlet sleeve.

29. A fuel hose breakaway unit as in claim 23, wherein the outer side surfaces of the splines are angled to space their outer ends, whereby these ends may be flexed to firmly grip to longitudinal slots in the inner sleeve.

30. A fuel hose breakaway unit as in claim 27, wherein the fingers have a circumferential groove in the outer surfaces thereof, and the resilient means comprise a garter spring disposed in said groove, the inlet sleeve has blind slots extending inwardly from the inner end thereof, the vane means are disposed in said slots and engage the ends of the slots to lock the inlet body in one axial direction relative thereto, the inlet sleeve has longitudinal lugs proximate the garter spring and engageable therewith to lock the inlet body relative to the sleeve in the other axial direction relative to the sleeve.

* * * * *